United States Patent
Husain et al.

(10) Patent No.: US 12,020,124 B2
(45) Date of Patent: Jun. 25, 2024

(54) SELECTING OPTIMUM PRIMARY AND SECONDARY PARAMETERS TO CALIBRATE AND GENERATE AN UNBIASED FORECASTING MODEL

(71) Applicant: Accenture Global Solutions Limited, Dublin (IE)

(72) Inventors: Afzal Husain, Parker, TX (US); Suresh Aswathnarayana, Mukiltoe, WA (US); Ashesh Parikh, Frisco, TX (US); Paolo Astro, Milan (IT); Mercedes Monroy, Toluca (MX)

(73) Assignee: Accenture Global Solutions Limited, Dublin (IE)

( * ) Notice: Subject to any disclaimer, the term of this patent is extended or adjusted under 35 U.S.C. 154(b) by 770 days.

(21) Appl. No.: 16/743,952

(22) Filed: Jan. 15, 2020

(65) Prior Publication Data
US 2021/0216907 A1   Jul. 15, 2021

(51) Int. Cl.
*G06Q 10/0633* (2023.01)
*G06N 7/01* (2023.01)
(Continued)

(52) U.S. Cl.
CPC .............. *G06N 20/00* (2019.01); *G06N 7/01* (2023.01); *G06Q 10/0633* (2013.01); *G06Q 30/0202* (2013.01)

(58) Field of Classification Search
None
See application file for complete search history.

(56) References Cited

U.S. PATENT DOCUMENTS

| | | | |
|---|---|---|---|
| 7,716,022 B1 | 5/2010 | Park et al. | |
| 2007/0094171 A1* | 4/2007 | Burges | G06N 3/08 706/16 |

(Continued)

OTHER PUBLICATIONS

Usha Ramanathan, Luc Muyldermans, Identifying demand factors for promotional planning and forecasting: A case of a soft drink company in the UK, International Journal of Production Economics, vol. 128, Issue 2, (Year: 2010).*

(Continued)

*Primary Examiner* — Rutao Wu
*Assistant Examiner* — Zahra Elkassabgi
(74) *Attorney, Agent, or Firm* — Harrity & Harrity, LLP

(57) ABSTRACT

A device may receive demand data associated with a product or a service, multiple forecasting models, and multiple cost functions, and may identify primary parameters for the multiple models based on the demand data. The device may utilize a model to rank the multiple forecasting models and the multiple cost functions based on the primary parameters, and may select optimum primary parameters based on ranking the multiple forecasting models and the multiple cost functions. The device may identify secondary parameters for the multiple forecasting models based on the demand data and the optimum primary parameters. The device may select optimum secondary parameters based on ranking the multiple forecasting models and the multiple cost functions, and may select a forecasting model, from the multiple forecasting models, based on the optimum primary parameters and the optimum secondary parameters. The device may perform one or more actions based on selecting the forecasting model.

20 Claims, 14 Drawing Sheets

(51) Int. Cl.
*G06N 20/00* (2019.01)
*G06Q 30/0202* (2023.01)

(56) References Cited

U.S. PATENT DOCUMENTS

| | | | | |
|---|---|---|---|---|
| 2013/0325787 | A1* | 12/2013 | Gerken | G06N 5/048 |
| | | | | 706/52 |
| 2014/0278775 | A1 | 9/2014 | Chan et al. | |
| 2015/0088606 | A1* | 3/2015 | Tyagi | G06Q 30/0202 |
| | | | | 705/7.31 |
| 2015/0317589 | A1 | 11/2015 | Anderson et al. | |
| 2019/0095785 | A1* | 3/2019 | Sarkar | G06N 20/00 |

OTHER PUBLICATIONS

Nikolaos Kourentzesa, Optimising forecasting models for inventory planning International Journal of Production Economics (Year: 2020).*

M. Shepperd and M. Cartwright, "A replication of the use of regression towards the mean (R2M) as an adjustment to effort estimation models," 11th IEEE International Software Metrics Symposium (METRICS'05), Como, Italy, 2005, pp. 10 pp. -38, doi: 10.1109/METRICS.2005.5. (Year: 2005).*

M. Afshin, A. Sadeghian and K. Raahemifar, "On Efficient Tuning of LS-SVM Hyper-Parameters in Short-Term Load Forecasting: A Comparative Study," 2007 IEEE Power Engineering Society General Meeting, 2007, pp. 1-6, doi: 10.1109/PES.2007.385613. (Year: 2007).*

Ferreira et al., "Analytics for an Online Retailer: Demand Forecasting and Price Optimization", https://dash.harvard.edu/handle/1/26964422, Jan. 15, 2014, 42 pages.

Big Data Analytics, "Forecasting and Planning in Retail", 2019, 10 pages.

* cited by examiner

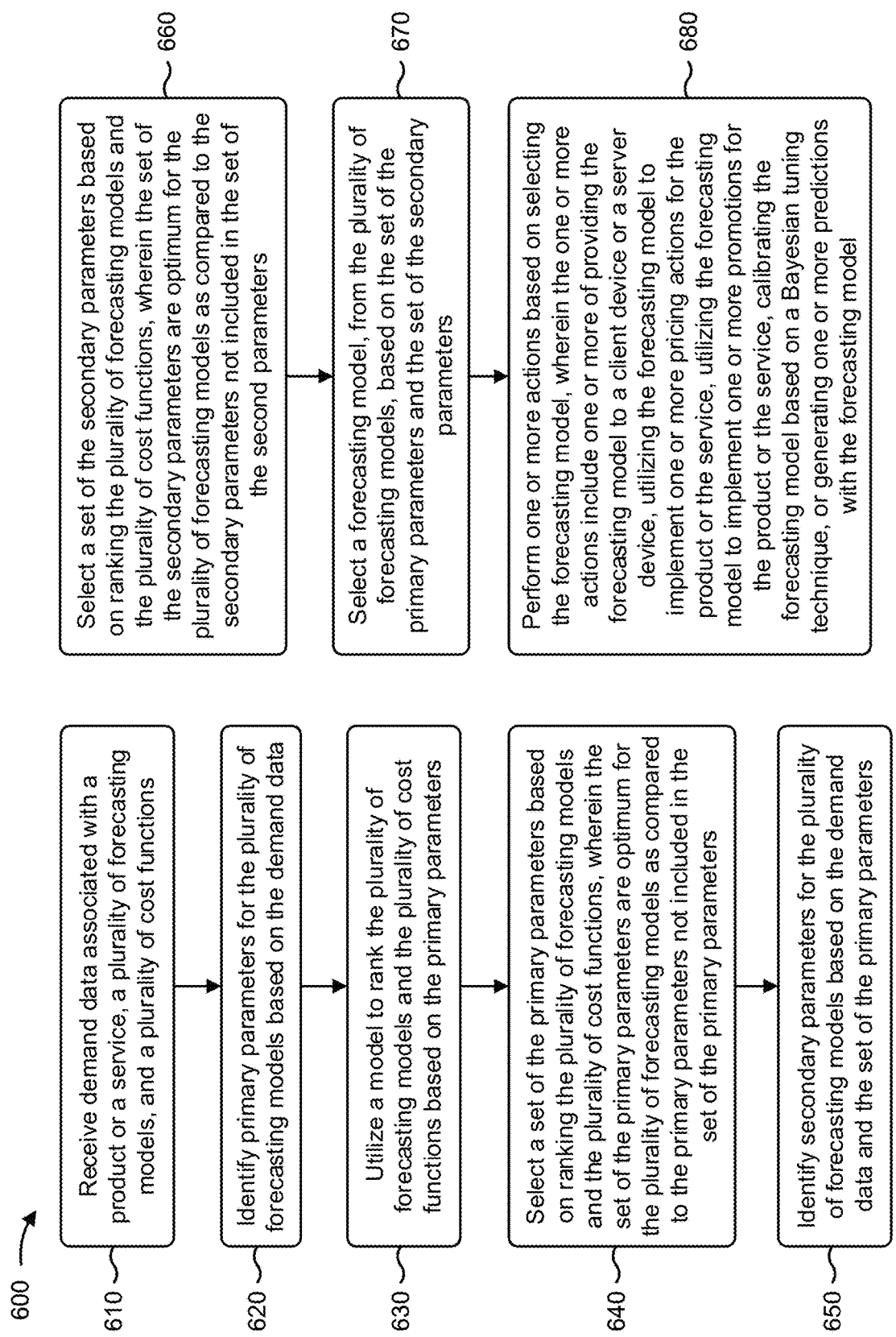

SELECTING OPTIMUM PRIMARY AND SECONDARY PARAMETERS TO CALIBRATE AND GENERATE AN UNBIASED FORECASTING MODEL

BACKGROUND

Time-series analysis includes methods for analyzing time series data in order to extract meaningful statistics and other characteristics of the data. Time-series forecasting is the use of a model to predict future values based on previously observed values. Time-series forecasting may be used with non-stationary data, such as economic data, weather data, stock price data, retail sales data, and/or the like.

SUMMARY

According to some implementations, a method may include receiving demand data associated with a product or a service, a plurality of forecasting models (e.g., time series decomposition models), and a plurality of cost functions, and identifying primary parameters for the plurality of forecasting models based on the demand data. The method may include utilizing a model to rank the plurality of forecasting models (e.g., time series decomposition models) and the plurality of cost functions based on the primary parameters, and selecting a set of the primary parameters based on ranking the plurality of forecasting models (e.g., time series decomposition models) and the plurality of cost functions, wherein the set of the primary parameters are optimum for the plurality of forecasting models as compared to the primary parameters not included in the set of the primary parameters. The method may include identifying secondary parameters for the plurality of forecasting models based on the demand data and the set of the primary parameters, and selecting a set of the secondary parameters based on ranking the plurality of forecasting models and the plurality of cost functions, wherein the set of the secondary parameters are optimum for the plurality of forecasting models as compared to the secondary parameters not included in the set of the second parameters. The method may include selecting a forecasting model, from the plurality of forecasting models, based on the set of the primary parameters and the set of the secondary parameters, and performing one or more actions based on selecting the forecasting model.

According to some implementations, a device may include one or more memories, and one or more processors, communicatively coupled to the one or more memories, to receive demand data associated with a product or a service, a plurality of forecasting models (e.g., time series decomposition models), and a plurality of cost functions, and correct parameters associated with the plurality of forecasting models based on the demand data. The one or more processors may identify primary parameters for the plurality of forecasting models based on the demand data, and may utilize a model to rank the plurality of forecasting models and the plurality of cost functions based on the primary parameters. The one or more processors may select a set of the primary parameters based on ranking the plurality of forecasting models and the plurality of cost functions, wherein the set of the primary parameters are optimum for the plurality of forecasting models as compared to the primary parameters not included in the set of the primary parameters. The one or more processors may identify secondary parameters for the plurality of forecasting models based on the demand data and the set of the primary parameters, and may select a set of the secondary parameters based on ranking the plurality of forecasting models and the plurality of cost functions, wherein the set of the secondary parameters are optimum for the plurality of forecasting models as compared to the secondary parameters not included in the set of the second parameters. The one or more processors may select a forecasting model, from the plurality of forecasting models, based on the set of the primary parameters and the set of the secondary parameters, and may perform one or more actions based on selecting the forecasting model.

According to some implementations, a non-transitory computer-readable medium may store one or more instructions that, when executed by one or more processors of a device, may cause the one or more processors to receive demand data associated with a product or a service, a plurality of forecasting models (e.g., time series decomposition models), and a plurality of cost functions, and identify primary parameters for the plurality of forecasting models based on the demand data. The one or more instructions may cause the one or more processors to utilize a model to rank the plurality of forecasting models and the plurality of cost functions based on the primary parameters, and select a set of the primary parameters based on ranking the plurality of forecasting models and the plurality of cost functions, wherein the set of the primary parameters are optimum for the plurality of forecasting models as compared to the primary parameters not included in the set of the primary parameters. The one or more instructions may cause the one or more processors to identify secondary parameters for the plurality of forecasting models based on the demand data and the set of the primary parameters, and select a set of the secondary parameters based on ranking the plurality of forecasting models and the plurality of cost functions, wherein the set of the secondary parameters are optimum for the plurality of forecasting models as compared to the secondary parameters not included in the set of the second parameters. The one or more instructions may cause the one or more processors to select a forecasting model, from the plurality of forecasting models, based on the set of the primary parameters and the set of the secondary parameters, and perform one or more actions based on selecting the forecasting model, wherein the one or more actions include one or more of: providing the forecasting model to a client device or a server device, utilizing the forecasting model to implement one or more pricing actions for the product or the service, utilizing the forecasting model to implement one or more promotions for the product or the service, calibrating the forecasting model based on a Bayesian tuning technique, or generating one or more predictions with the forecasting model.

BRIEF DESCRIPTION OF THE DRAWINGS

FIGS. 4-6 are flow charts of example processes for selecting optimum primary parameters and secondary parameters to calibrate and generate an unbiased forecasting model.

DETAILED DESCRIPTION

Figure 1A:
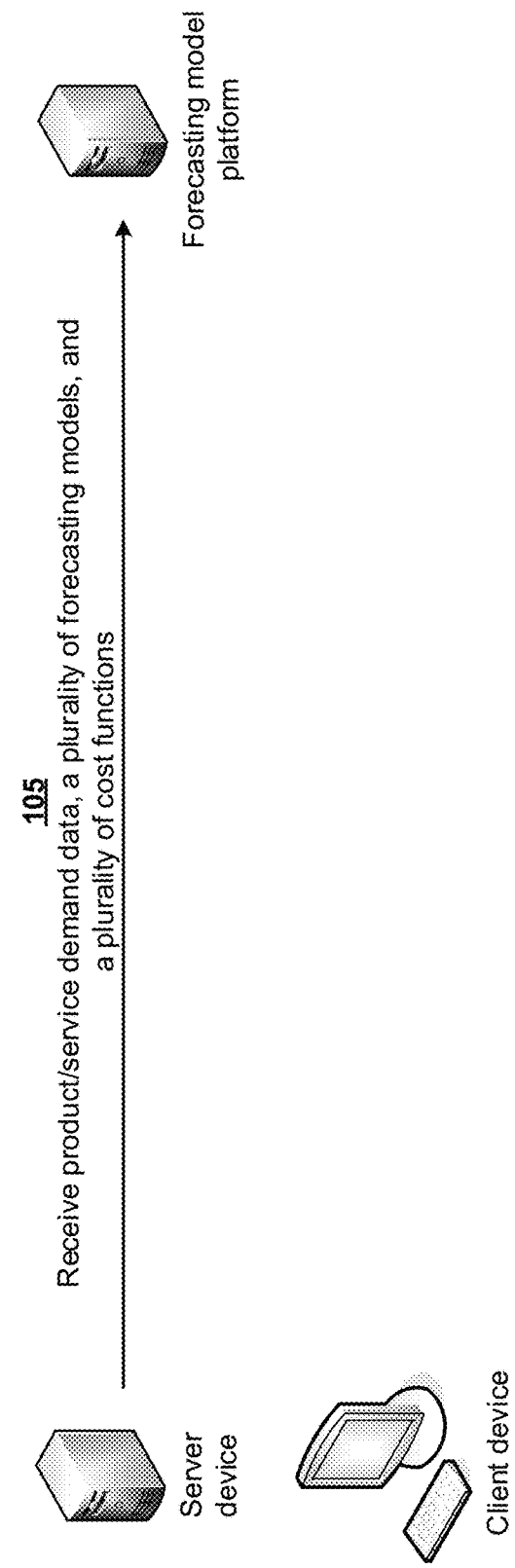
FIGS. 1A-1I are diagrams of one or more example implementations described herein.

The following detailed description of example implementations refers to the accompanying drawings. The same reference numbers in different drawings may identify the same or similar elements.

Currently, forecasting models are used to make predictions by data scientists. A particular type of forecasting model that data scientists use are time series decomposition models. However, these forecasting models are made using syndicated data, data that is blended between business-to-business (B2B) and business-to-consumer (B2C) categories, and/or the like. Product demand forecasting with forecasting models and time series decomposition with state space models in particular can be challenging when there are large numbers of competing products, as well as products from a same family of products. Such forecasting models are manually created, are slow and expensive when transitioning to new markets, and are highly dependent on choices made by individual data scientists. Thus, current forecasting models waste computing resources (e.g., processing resources, memory resources, and/or the like), networking resources, and/or the like associated with utilizing incorrect data for the forecasting models, transitioning the forecasting models to new markets, utilizing biased forecasting models, and/or like.

Some implementations described herein provide a forecasting model platform that selects optimum primary parameters and secondary parameters to calibrate and generate an unbiased forecasting model. For example, the forecasting model platform may receive demand data associated with a product or a service, multiple forecasting models (e.g., time series decomposition models), and multiple cost functions, and may identify primary parameters for the plurality of forecasting models based on the demand data. The forecasting model platform may utilize a model to rank the multiple forecasting models and the multiple cost functions based on the primary parameters, and may select optimum primary parameters based on ranking the multiple forecasting models and the multiple cost functions. The forecasting model platform may identify secondary parameters for the multiple forecasting models based on the demand data and the optimum primary parameters, and may select optimum secondary parameters based on ranking the multiple forecasting models and the multiple cost functions. The forecasting model platform may select a forecasting model, from the multiple forecasting models, based on the optimum primary parameters and the optimum secondary parameters, and may perform one or more actions based on selecting the forecasting model.

In this way, the forecasting model platform may generate calibrated and unbiased forecasting models (e.g., time series decomposition models) that utilize optimum primary parameters and secondary parameters. This, in turn, conserves computing resources (e.g., processing resources, memory resources, and/or the like), communication resources, networking resources, and/or the like that would otherwise be wasted utilizing incorrect data for the forecasting models, transitioning the forecasting models to new markets, utilizing biased forecasting models, and/or like. Furthermore, the forecasting model platform may generate accurate forecasting models that are insensitive to outliers or non-recurring events (e.g., that predict trends without being influenced by one-time events), that process syndicated data with minimal pre-processing, that leverage big data techniques to scale to different clients, and/or the like. This further conserves computing resources, communication resources, networking resources, and/or the like that would otherwise be wasted generating forecasting models that are inaccurate, require maximum pre-processing of syndicated data, do not utilize big data techniques, and/or the like.

FIGS. 1A-1I are diagrams of one or more example implementations 100 described herein. As shown in FIG. 1A, example implementation 100 may include a server device and a client device associated with a forecasting model platform. The server device and/or the client device may store product and/or service (product/service) demand data, a plurality of forecasting models, a plurality of cost functions, and/or the like. The server device and/or the client device may be associated with an entity (e.g., a company, a government agency, and/or the like) that utilizes forecasting models to predict future values based on previously observed values. In some implementations, the forecasting models may include time series decomposition models.

As further shown in FIG. 1A, and by reference number 105, the forecasting model platform may receive, from the server device and/or the client device, product/service demand data, a plurality of forecasting models (e.g., time series decomposition models), and a plurality of cost functions. The forecasting model platform may periodically receive the product/service demand data, the plurality of forecasting models, and/or the plurality of cost functions; may continuously receive the product/service demand data, the plurality of forecasting models, and/or the plurality of cost functions; may receive the product/service demand data, the plurality of forecasting models, and/or the plurality of cost functions based on a request; and/or the like. The forecasting model platform may store the product/service demand data, the plurality of forecasting models, and/or the plurality of cost functions in a data structure (e.g., a database, a table, a list, and/or the like) associated with the forecasting model platform.

The product/service demand data may include data associated with products, services, product/service relationships, customers of products and/or services, vendors of products and/or services, stores selling products and/or services, inventories of productions and/or services, distribution of products and/or services, marketing of products and/or services, prices of products and/or services, and/or the like, that is relevant to demands (e.g., consumer demands) for products and/or services. In some implementations, the product/service demand data may include syndicated demand data associated with the product or the service. The syndicated demand data may include general demand data associated with the product and/or service (e.g., general market data collected from multiple retailers within a given segment of a market) that is not specific to any one client. For example, the syndicated demand data may be collected by market research firms and then purchased by businesses who have a vested interest in the market. In some implementations, the product/service demand data may include data that is blended between business-to-business (B2B) and business-to-consumer (B2C) categories.

The plurality of forecasting models may include time series decomposition models, historical average models (e.g., simple moving averages models, exponential smoothing models, and/or the like); time series models (e.g., seasonal autoregressive integrated moving average with explanatory variable (ARIMAX) models, generalized additive models, and/or the like); machine learning and/or artificial intelligence models (e.g., random forest models, gradient boosted machine learning models, neural networks, support vector machines, and/or the like); and/or the like.

The plurality of cost functions may include functions that measure performance of a machine learning model for particular data (e.g., the product/service demand data). The cost functions may quantify errors between predicted values and expected values and may present the errors as real numbers. Depending on a problem, the cost functions may be formed in many different ways, and a purpose of the cost functions may be to minimize (e.g., return values indicating costs, losses, or errors with a goal to find values of model parameters for which the cost functions return the smallest values as possible) or to maximize (e.g., return values indicating rewards with a goal to find values of model parameters for which the cost functions return the largest values as possible).

In some implementations, there may be thousands, millions, billions, and/or the like, of data points provided in the product/service demand data, the plurality of forecasting models, and/or the plurality of cost functions. In this way, the forecasting model platform may handle thousands, millions, billions, and/or the like, of data points within a period of time (e.g., daily, weekly, monthly), and thus may provide "big data" capability.

In some implementations, the forecasting model platform may process the plurality of forecasting models, with a machine learning model, to generate a plurality of optimized forecasting models as compared to the plurality of forecasting models. The forecasting model platform may separate data associated with the plurality of forecasting models into a training set, a validation set, a test set, and/or the like. The training set may be utilized to train the machine learning model. The validation set may be utilized to validate results of the trained machine learning model. The test set may be utilized to test operation of the machine learning model.

In some implementations, the forecasting model platform may train the machine learning model using, for example, an unsupervised training procedure and based on the data association with the plurality of forecasting models. For example, the forecasting model platform may perform dimensionality reduction to reduce the data association with the plurality of forecasting models to a minimum feature set, thereby reducing resources (e.g., processing resources, memory resources, and/or the like) to train the machine learning model, and may apply a classification technique to the minimum feature set.

In some implementations, the forecasting model platform may use a logistic regression classification technique to determine a categorical outcome (e.g., a prediction of optimal parameters for a forecasting model). Additionally, or alternatively, the forecasting model platform may use a naïve Bayesian classifier technique. In this case, the forecasting model platform may perform binary recursive partitioning to split the data association with the plurality of forecasting models into partitions and/or branches, and use the partitions and/or branches to determine outcomes (e.g., a prediction of optimal parameters for a forecasting model). Based on using recursive partitioning, the forecasting model platform may reduce utilization of computing resources relative to manual, linear sorting and analysis of data points, thereby enabling use of thousands, millions, or billions of data points to train the machine learning model, which may result in more accurate models than using fewer data points.

Additionally, or alternatively, the forecasting model platform may use a support vector machine (SVM) classifier technique to generate a non-linear boundary between data points in the training set. In this case, the non-linear boundary is used to classify test data into a particular class.

Additionally, or alternatively, the forecasting model platform may train the machine learning model using a supervised training procedure that includes receiving input to the machine learning model from a subject matter expert, which may reduce an amount of time, an amount of processing resources, and/or the like to train the machine learning model relative to an unsupervised training procedure. In some implementations, the forecasting model platform may use one or more other model training techniques, such as a neural network technique, a latent semantic indexing technique, and/or the like. For example, the forecasting model platform may perform an artificial neural network processing technique (e.g., using a two-layer feedforward neural network architecture, a three-layer feedforward neural network architecture, and/or the like) to perform pattern recognition with regard to patterns of the data association with the plurality of forecasting models. In this case, using the artificial neural network processing technique may improve an accuracy of the trained machine learning model generated by the forecasting model platform by making the model more robust to noisy, imprecise, or incomplete data, and by enabling the forecasting model platform to detect patterns and/or trends undetectable to human analysts or systems using less complex techniques.

In some implementations, rather than training the machine learning model, the forecasting model platform may obtain the machine learning model from another system or device that trained the machine learning model to generate the machine learning model. In this case, the forecasting model platform may provide the other system or device with the data association with the plurality of forecasting models for use in training the machine learning model, and may provide the other system or device with updated data associated with the plurality of forecasting models to retrain the machine learning model in order to update the machine learning model.

Figure 1B:
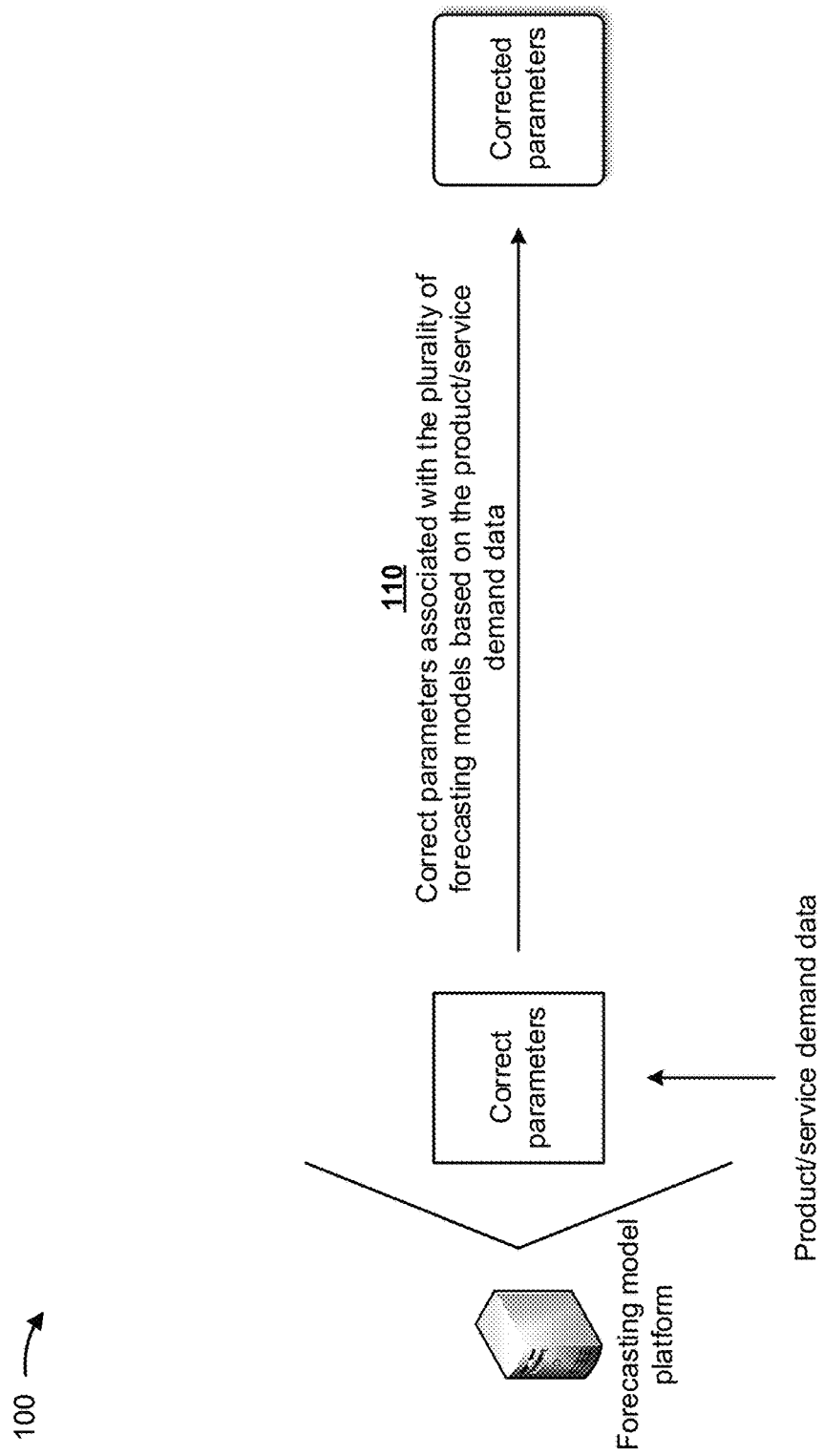

As shown in FIG. 1B, and by reference number 110, the forecasting model platform may correct parameters associated with the plurality of forecasting models based on the product/service demand data. For example, the forecasting model platform may correct the parameters based on minimizing model errors associated with the plurality of forecasting models. In some implementations, the forecasting model platform may utilize a data cleansing model to correct errors in the product/service demand data and the parameters. For example, the forecasting model platform may utilize the data cleansing model to detect and correct (or remove) corrupt or inaccurate product/service demand data (e.g., records from a record set, table, or database), and to replace, modify, or delete the corrupt or inaccurate product/service demand data. The data cleansing model may detect and correct inconsistencies originally caused by user entry errors, by corruption in transmission or storage, or by utilization of different definitions for similar data in different data stores.

The data cleansing model may remove typographical errors or validate and correct values against a known list of entities. In this case, validation may be strict (e.g., rejecting any address that does not have a valid postal code) or fuzzy (e.g., correcting records that partially match existing, known records). The data cleansing model may clean the product/service demand data by cross checking the product/service demand data with a validated data set, standardizing the product/service demand data by changing a reference data set to a new standard (e.g., use of standard codes), and/or the like. Additionally, the data cleansing model may include data enhancement, where the product/service demand data is made more complete by adding related information (e.g., appending an address with any phone number related to that address). The data cleansing model may harmonize the product/service demand data (e.g., harmonize short codes (e.g., St, Rd, and/or the like)) to actual words (e.g., street, road, and/or the like)).

In some implementations, a parameter associated with the plurality of forecasting models may include a numerical or other measurable factor forming a set that defines a system of sets of conditions. For example, the parameters associated with the plurality of forecasting models may include primary or core parameters (e.g., alpha, beta, gamma, and/or the like), secondary parameters (e.g., alpha end, alpha increment, sigma, trend dampening, and/or the like), time-based parameters (e.g., season periods, period indicators, forecast horizons, historical periods, and/or the like), and/or the like.

An alpha parameter (e.g., a base value) may include a value that determines a weighting of past data values in setting a baseline (e.g., a magnitude) for a forecast. Higher values of alpha lead to an increased weight being provided to most recent observations, and lower values of alpha imply more uniform weighting of observations. An alpha end parameter may include an end value for the alpha parameter, and an alpha increment parameter may include a increment value for the alpha parameter.

A beta parameter (e.g., a trend value) may include a value that determines a degree to which recent data trends should be valued, as compared to older trends, when determining a forecast.

A gamma parameter is a seasonal component of a forecast, where a greater gamma value may cause a greater weight to be applied to the recent seasonal component. The seasonal component is a repeating pattern of a forecast, and a seasonal pattern is a seasonal pattern per year.

A sigma parameter may include an expectation of a squared deviation of a random variable from a mean of the variable. The sigma parameter may measure how far a set of numbers are spread out from an average value of the numbers.

A trend dampening parameter may include a value that is multiplied by a trend value (e.g., growth rate) when a forecast value is calculated. The trend dampening parameter makes it possible to reduce or increase growth in a long-term trend.

Figure 1C:
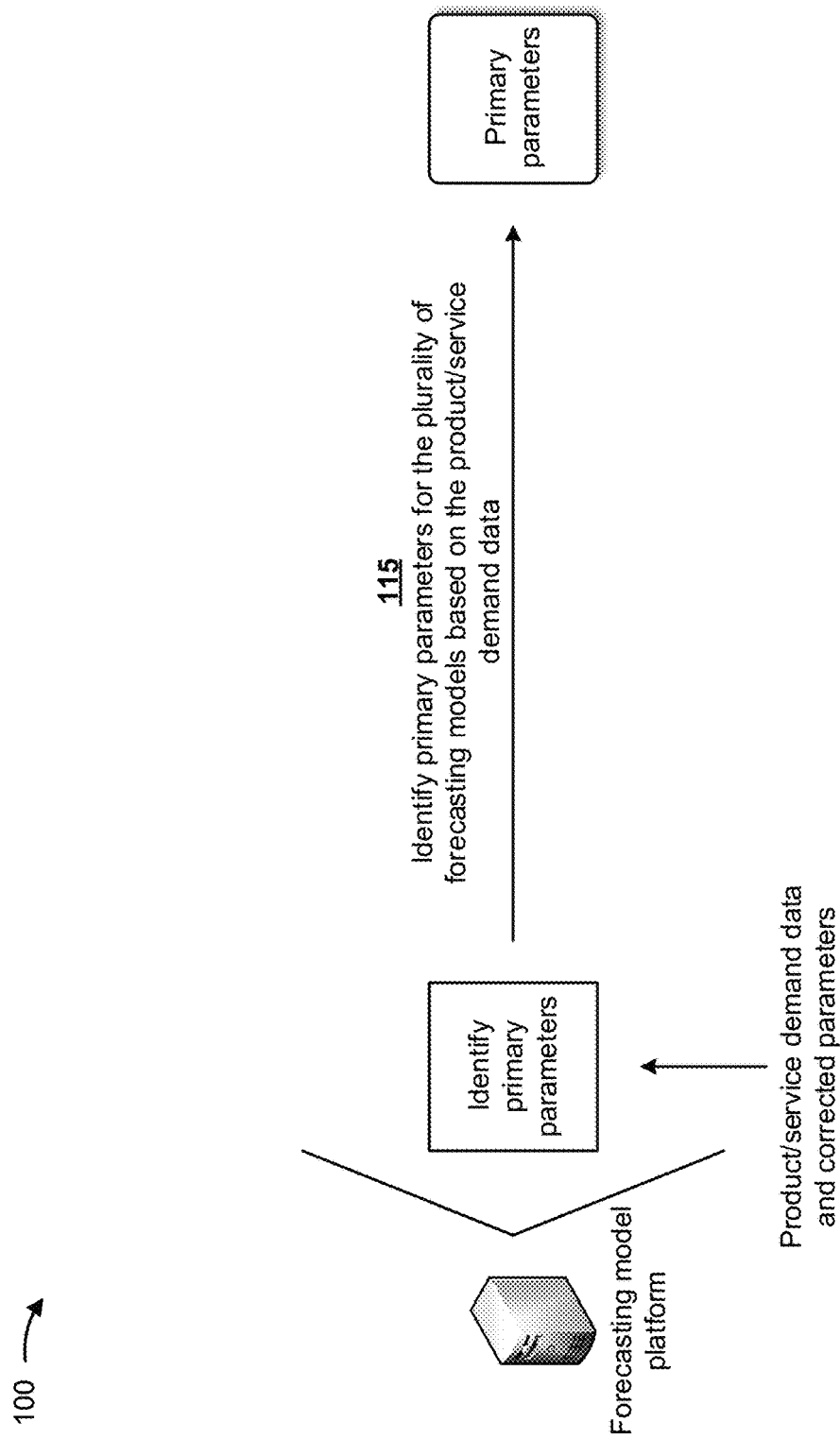

As shown in FIG. 1C, and by reference number 115, the forecasting model platform may identify primary parameters for the plurality of forecasting models based on the product/service demand data. The primary parameters for the plurality of forecasting models may include factors forming a set that defines a system of sets of conditions. In one example, the primary parameters may include the alpha parameter, the beta parameter, the gamma parameter, and/or the like, as described above. In another example, the primary parameters may include a parameter identifying a priority list of variables, a parameter identifying an exhaustive true/false search for all variables, a parameter identifying a false model average of variables per a Bayesian framework, a parameter identifying reconsidered true/false variables, and/or the like.

Figure 1D:
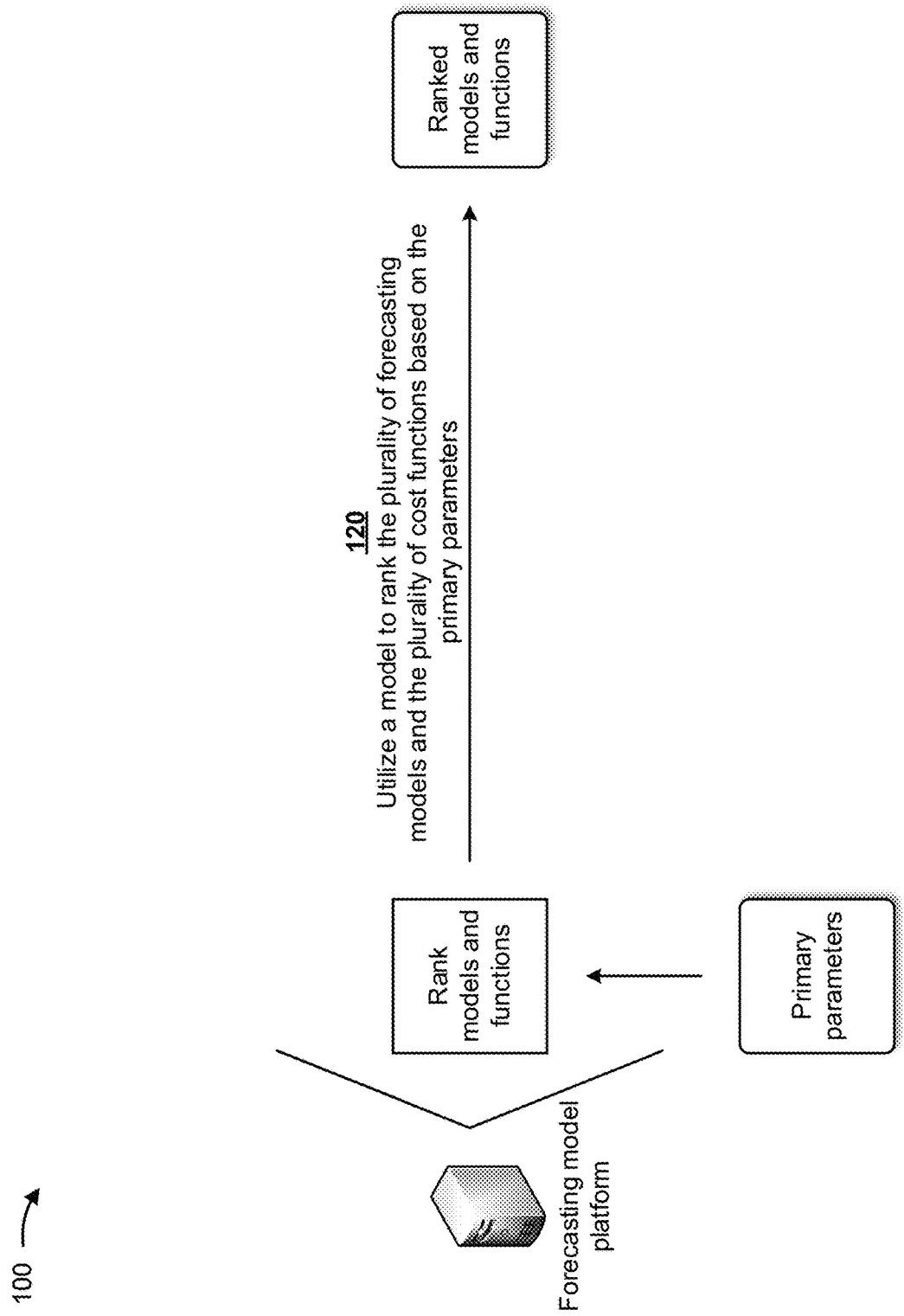

As shown in FIG. 1D, and by reference number 120, the forecasting model platform may utilize a model to rank the plurality of forecasting models and the plurality of cost functions based on the primary parameters. In some implementations, the model may include a global minimization of error model, a mean absolute percentage error (MAPE) model, an R-squared regression model, and/or the like. The global minimization of error model may include a model that determines a global minima of error associated with each of the forecasting models and each of the cost functions based on the primary parameters. The MAPE model may include a model that determines a mean absolute percentage error to measure a prediction accuracy of each of the forecasting models and each of the cost functions as a percentage (e.g., calculated as an average absolute percent error for each time period minus actual values, divided by actual values), based on the primary parameters. The R-squared regression model may include a model that determines a coefficient of determination ($R^2$) for each of the forecasting models and each of the cost functions based on the primary parameters.

The forecasting model platform may utilize the model (e.g., the global minimization of error model, the MAPE model, the R-squared regression model, and/or the like) to determine results for each of the forecasting models and each of the cost functions based on the primary parameters, and may rank the plurality of forecasting models and the plurality of cost functions based on the results. For example, the forecasting model platform may rank a forecasting model and/or a cost function with a greatest accuracy (e.g., a least amount of errors) first, may rank a forecasting model and/or a cost function with a smallest accuracy (e.g., a most amount of errors) last, and/or the like.

Figure 1E:
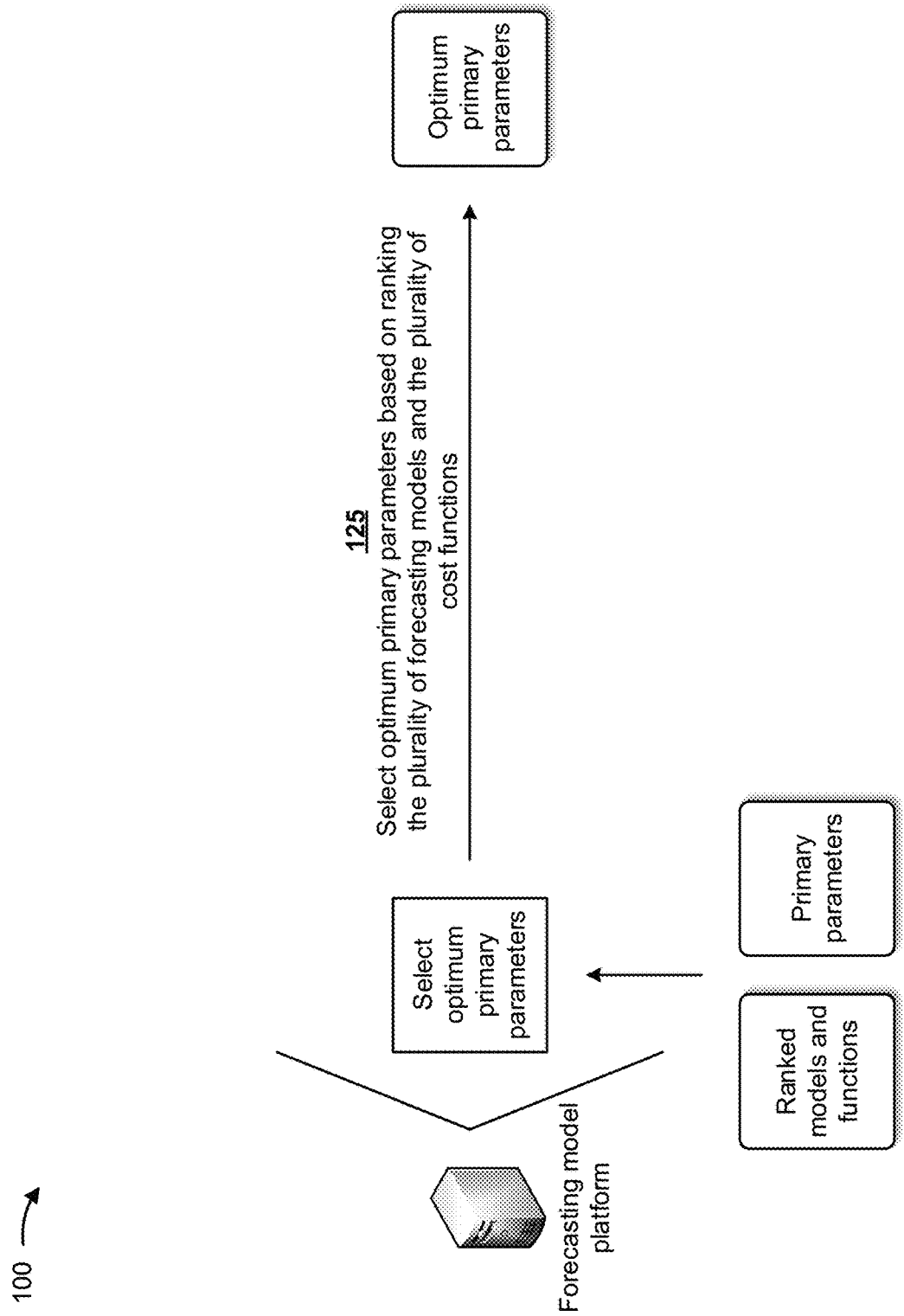

As shown in FIG. 1E, and by reference number 125, the forecasting model platform may select optimum primary parameters based on ranking the plurality of forecasting models and the plurality of cost functions. The optimum primary parameters may include a set of primary parameters selected from the identified primary parameters, and may be optimum for the plurality of forecasting models and/or the plurality of cost functions as compared to primary parameters not selected from the identified primary parameters. For example, the forecasting model platform may select primary parameters utilized with a highest ranked forecasting model and/or a highest ranked cost function as the optimum primary parameters.

In some implementations, when selecting the optimum primary parameters from the identified primary parameters, the forecasting model platform may process the product/service demand data with the plurality of forecasting models and based on the primary parameters and the ranks associated with the plurality of forecasting models. Processing the product/service demand data as such may generate output data. The forecasting model platform may process the product/service demand data and the output data, with the plurality of cost functions and based on the ranks associated with the plurality of cost functions, to determine differences between the product/service demand data and the output data. The forecasting model platform may select the set of the primary parameters (e.g., the optimum primary parameters), from the identified primary parameters, based on the differences between the product/service demand data and the output data.

For example, the forecasting model platform may simultaneously process the product/service demand data, with each of the plurality of forecasting models, based on a rank of each of the plurality of forecasting models, and based on the primary parameters, to generate the output data. The forecasting model platform may simultaneously process the product/service demand data and the output data, with each of the plurality of cost functions and based on a rank of each of the plurality of cost functions, to determine the differences between the product/service demand data and the output data. The forecasting model platform may select the optimum primary parameters based on the differences between the product/service demand data and the output data. In this way, the forecasting model platform may concurrently process each of the plurality of forecasting models and each of the plurality of cost functions to more quickly and efficiently determine the optimum primary parameters.

Figure 1F:
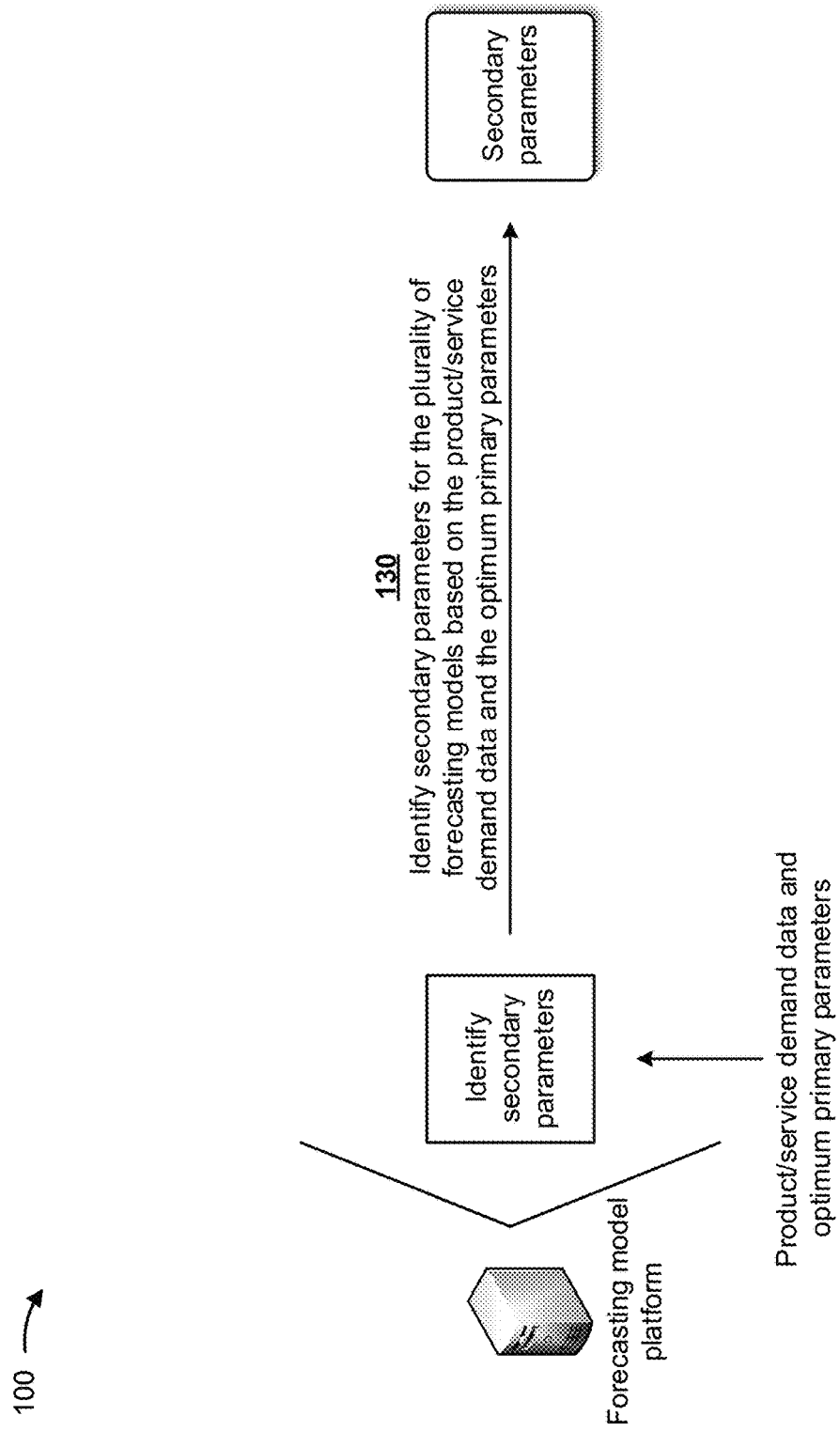

As shown in FIG. 1F, and by reference number 130, the forecasting model platform may identify secondary parameters for the plurality of forecasting models based on the product/service demand data and the optimum primary parameters. The secondary parameters for the plurality of forecasting models may include factors forming a set that defines a system of sets of conditions. In one example, the secondary parameters may include the alpha end parameter, the alpha increment parameter, the sigma parameter, the trend dampening parameter, and/or the like, as described above. In another example, the secondary parameters may include a parameter identifying a correlation threshold, a parameter identifying a variables-to-observations ratio, a smoothing parameter, a confidence interval parameter, a parameter identifying a quantity of variables created, a parameter identifying base price elasticities, a parameter identifying a promotion benchmark, and/or the like.

Figure 1G:
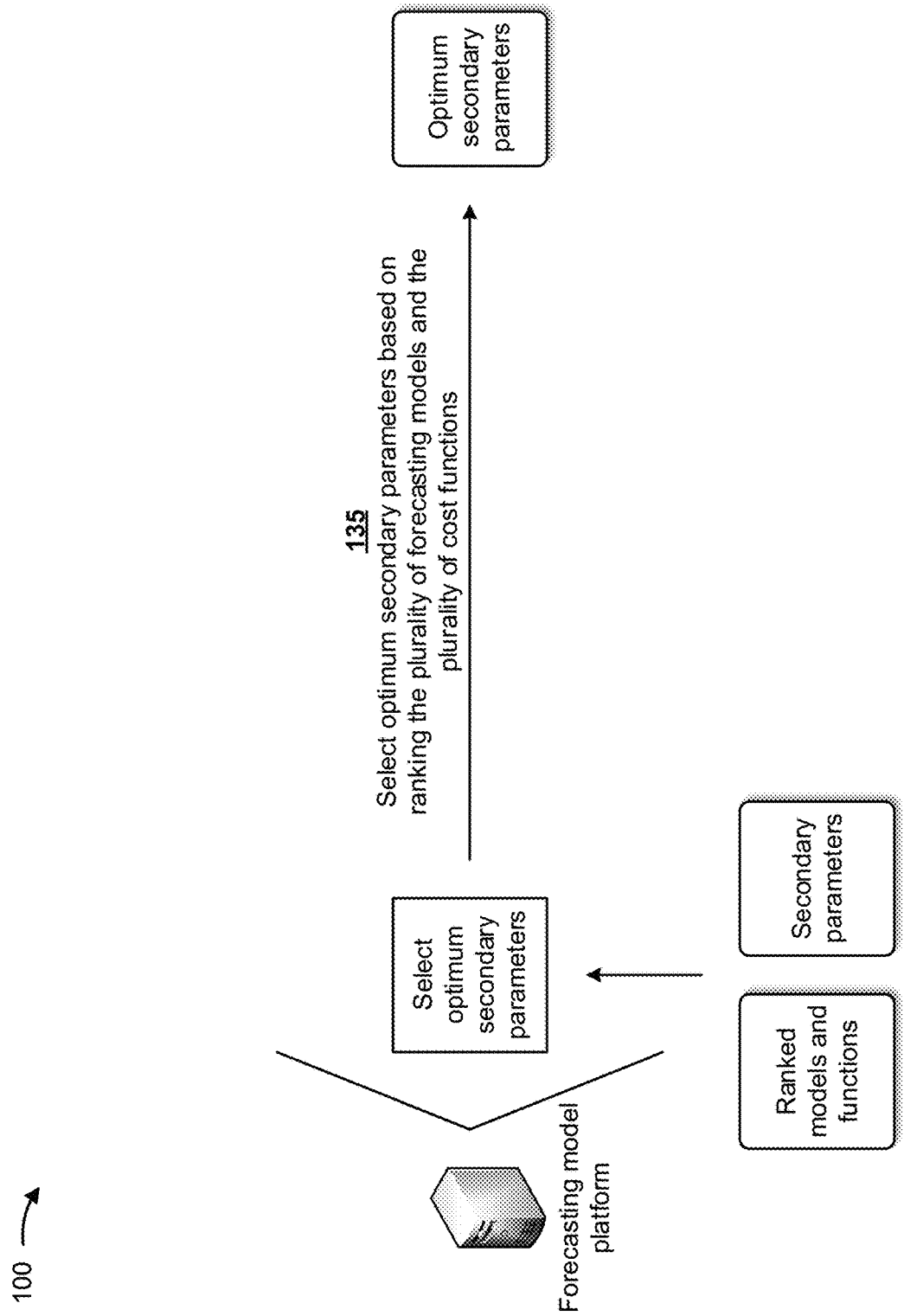

As shown in FIG. 1G, and by reference number 135, the forecasting model platform may select optimum secondary parameters based on ranking the plurality of forecasting models and the plurality of cost functions. The optimum secondary parameters may include a set of secondary parameters selected from the identified secondary parameters, and may be optimum for the plurality of forecasting models and/or the plurality of cost functions as compared to secondary parameters not selected from the identified secondary parameters. For example, the forecasting model platform may select secondary parameters utilized with a highest ranked forecasting model and/or a highest ranked cost function as the optimum secondary parameters.

In some implementations, when selecting the set of the secondary parameters, the forecasting model platform may process the product/service demand data with the plurality of forecasting models and based on the secondary parameters and the ranks associated with the plurality of forecasting models. Processing the product/service demand data as such may generate output data. The forecasting model platform may process the product/service demand data and the output data, with the plurality of cost functions and based on the ranks associated with the plurality of cost functions, to determine differences between the product/service demand data and the output data. The forecasting model platform may select the set of the secondary parameters (e.g., the optimum secondary parameters), from the identified secondary parameters, based on the differences between the product/service demand data and the output data.

For example, the forecasting model platform may simultaneously process the product/service demand data, with each of the plurality of forecasting models, based on a rank of each of the plurality of forecasting models, and based on the secondary parameters, to generate the output data. The forecasting model platform may simultaneously process the product/service demand data and the output data, with each of the plurality of cost functions and based on a rank of each of the plurality of cost functions, to determine the differences between the product/service demand data and the output data. The forecasting model platform may select the optimum secondary parameters based on the differences between the product/service demand data and the output data. In this way, the forecasting model platform may concurrently process each of the plurality of forecasting models and each of the plurality of cost functions to more quickly and efficiently determine the optimum secondary parameters.

Figure 1H:
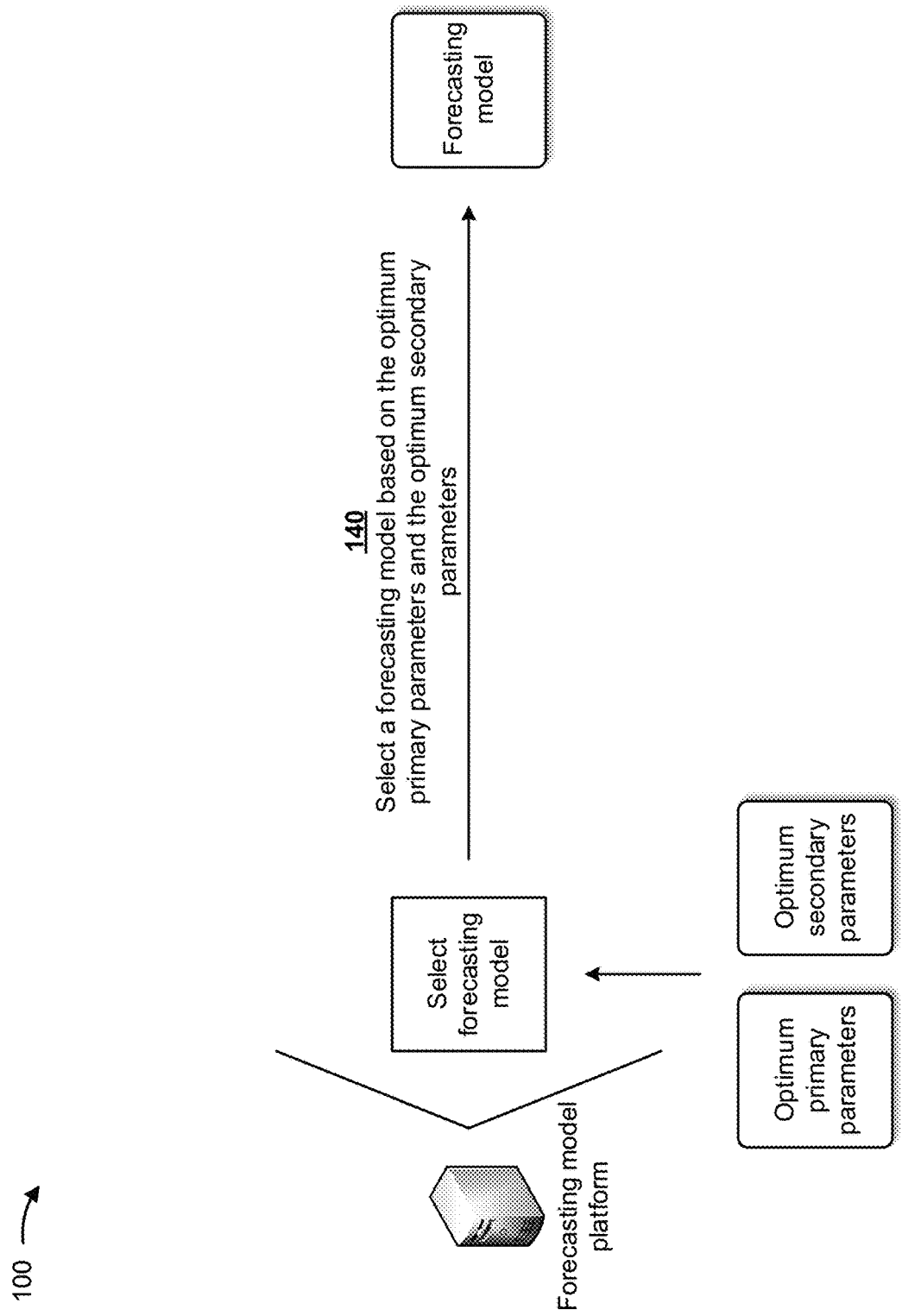

As shown in FIG. 1H, and by reference number 140, the forecasting model platform may select a forecasting model based on the optimum primary parameters and the optimum secondary parameters. In some implementations, the forecasting model platform may utilize a MAPE model and/or an R-squared regression model to select the forecasting model. For example, the forecasting model platform may utilize the MAPE model and/or the R-squared regression model to determine results for each of the forecasting models based on the optimum primary parameters and the optimum secondary parameters, and may rank the plurality of forecasting models based on the results. The forecasting model platform may rank a forecasting model with a greatest accuracy (e.g., a least amount of errors) first, may rank a forecasting model and/or a cost function with a smallest accuracy (e.g., a most amount of errors) last, and/or the like. The forecasting model platform may then select a highest ranked forecasting model as the selected forecasting model.

In this way, the forecasting model platform may utilize optimum primary parameters and secondary parameters to generate calibrated and unbiased forecasting models that are insensitive to outliers or non-recurring events, that process syndicated data with minimal pre-processing, that leverage big data techniques to scale to different clients, and/or the like. This conserves computing resources, communication resources, networking resources, and/or the like that would otherwise be wasted generating forecasting models that are inaccurate, require maximum pre-processing of syndicated data, do not utilize big data techniques, and/or the like.

Figure 1I:
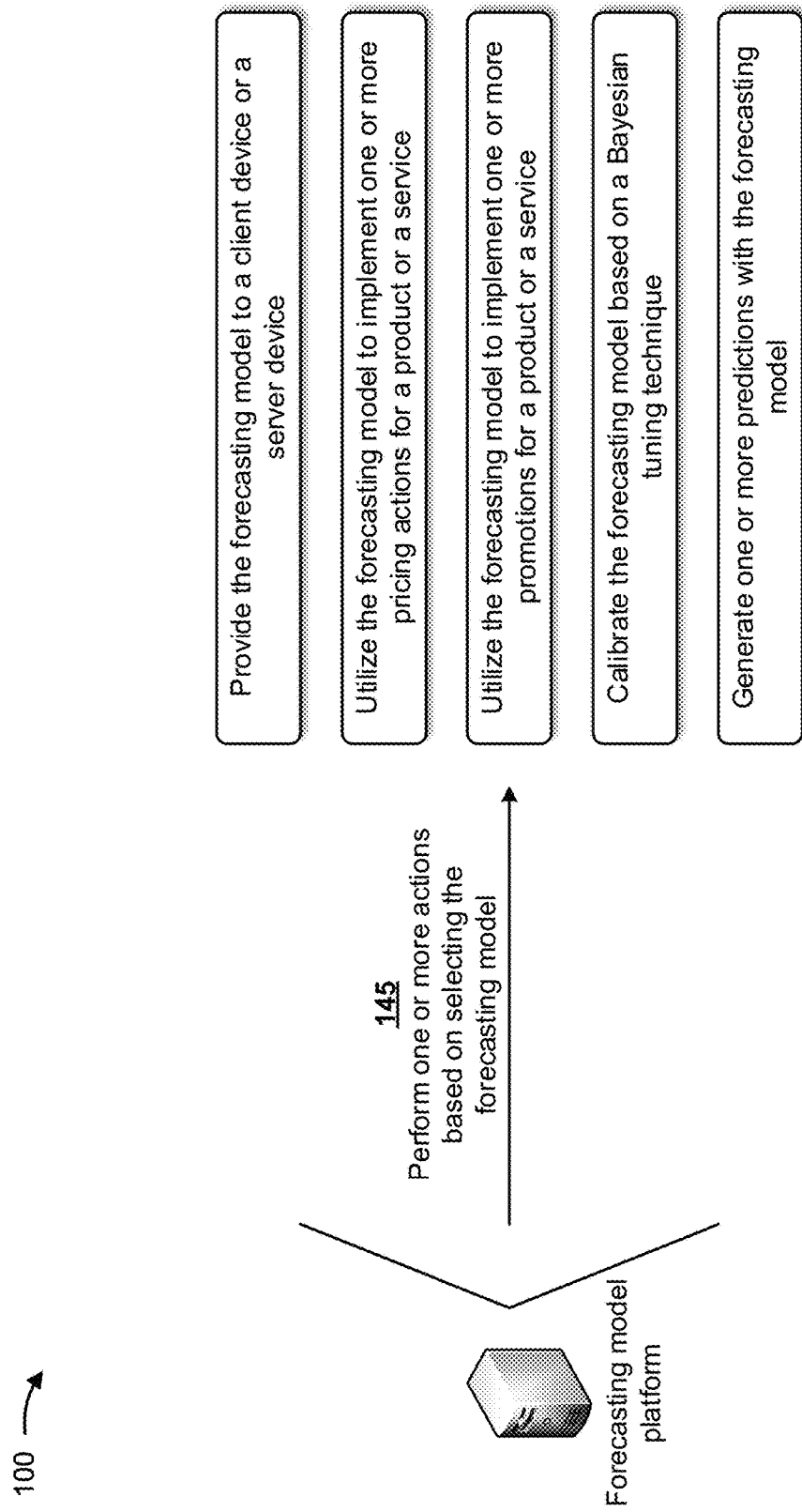

As shown in FIG. 1I, and by reference number 145, the forecasting model platform may perform one or more actions based on selecting the forecasting model. In some implementations, the one or more actions may include the forecasting model platform providing the forecasting model to a client device or a server device. In this way, the forecasting model platform may automatically provide a calibrated and unbiased forecasting model that users of the client device or the server device may utilize to forecast a demand associated with a product or a service. This may prevent such users from wasting computing resources, communication resources, networking resources, and/or the like associated with utilizing forecasting models that are inaccurate, require maximum pre-processing of syndicated data, do not utilize big data techniques, and/or the like.

In some implementations, the one or more actions may include the forecasting model platform utilizing the forecasting model to implement one or more pricing actions for a product or a service. For example, the forecasting model platform may implement pricing actions associated with coupons, rebates, wholesale prices, sale prices, and/or the like. In this way, the forecasting model platform may automatically facilitate pricing actions for the product or the service and may conserve computing resources, communication resources, networking resources, and/or the like that would otherwise be wasted determining incorrect pricing actions, implementing incorrect pricing actions, correcting incorrect pricing actions, and/or the like.

In some implementations, the one or more actions may include the forecasting model platform utilizing the forecasting model to implement one or more promotions for a product or a service. For example, the forecasting model platform may implement Internet promotions, social-media promotions, television and/or radio promotions, email promotions, promotional events, billboard promotions, advertisements, and/or the like. In this way, the forecasting model platform may automatically facilitate generation of promotions for the product or the service and may conserve computing resources, communication resources, networking resources, and/or the like that would otherwise be wasted determining incorrect promotions, implementing incorrect promotions, correcting incorrect promotions, and/or the like.

In some implementations, the one or more actions may include the forecasting model platform calibrating the forecasting model based on a Bayesian tuning technique. For example, the forecasting model platform may utilize a Bayesian tuning technique to further refine the optimum primary parameters and the optimum secondary parameters. In this way, the forecasting model platform may further improve the forecasting model, which may conserve computing resources, communication resources, networking resources, and/or the like that would otherwise be wasted utilizing forecasting models that are inaccurate, require maximum pre-processing of syndicated data, do not utilize big data techniques, and/or the like.

In some implementations, the one or more actions may include the forecasting model platform generating one or more predictions with the forecasting model. For example, the forecasting model platform may utilize the forecasting model to predict an impact of a pricing action and/or a promotion on a demand for a product and/or a service. In this way, the forecasting model platform may enable a business associated with a product or a service to improve business decisions and conserve computing resources, communication resources, networking resources, and/or the like utilized for such business decisions.

In some implementations, the forecasting model may be utilized to generate predictions other than predictions related to a product or a service. For example, the forecasting model may generate predictions associated with supply chain management, economics, earthquakes, credit ratings and credit scores, land use, player and team performance in sports, politics, technology, telecommunications, transportation, weather, and/or the like.

In this way, the forecasting model platform may generate calibrated and unbiased forecasting models that utilize optimum primary parameters and secondary parameters. This conserves computing resources (e.g., processing resources, memory resources, and/or the like), communication resources, networking resources, and/or the like that would otherwise be wasted utilizing incorrect data for the forecasting models, transitioning the forecasting models to new markets, utilizing biased forecasting models, and/or like. The forecasting model platform may generate accurate forecasting models that are insensitive to outliers or non-recurring events, that process syndicated data with minimal pre-processing, that leverage big data techniques to scale to different clients, and/or the like. This further conserves computing resources, communication resources, networking resources, and/or the like.

Furthermore, several different stages of the process for selecting optimum primary parameters and secondary parameters to calibrate and generate an unbiased forecasting model may be automated via models, which may improve speed and efficiency of the process and conserve computing resources, networking resources, and/or the like. Implementations described herein use a rigorous, computerized process to perform tasks or roles that were not previously performed. For example, currently there does not exist a technique that selects optimum primary parameters and secondary parameters to calibrate and generate an unbiased forecasting model.

As indicated above, FIGS. 1A-1I are provided merely as examples. Other examples may differ from what is described with regard to FIGS. 1A-1I.

Figure 2:
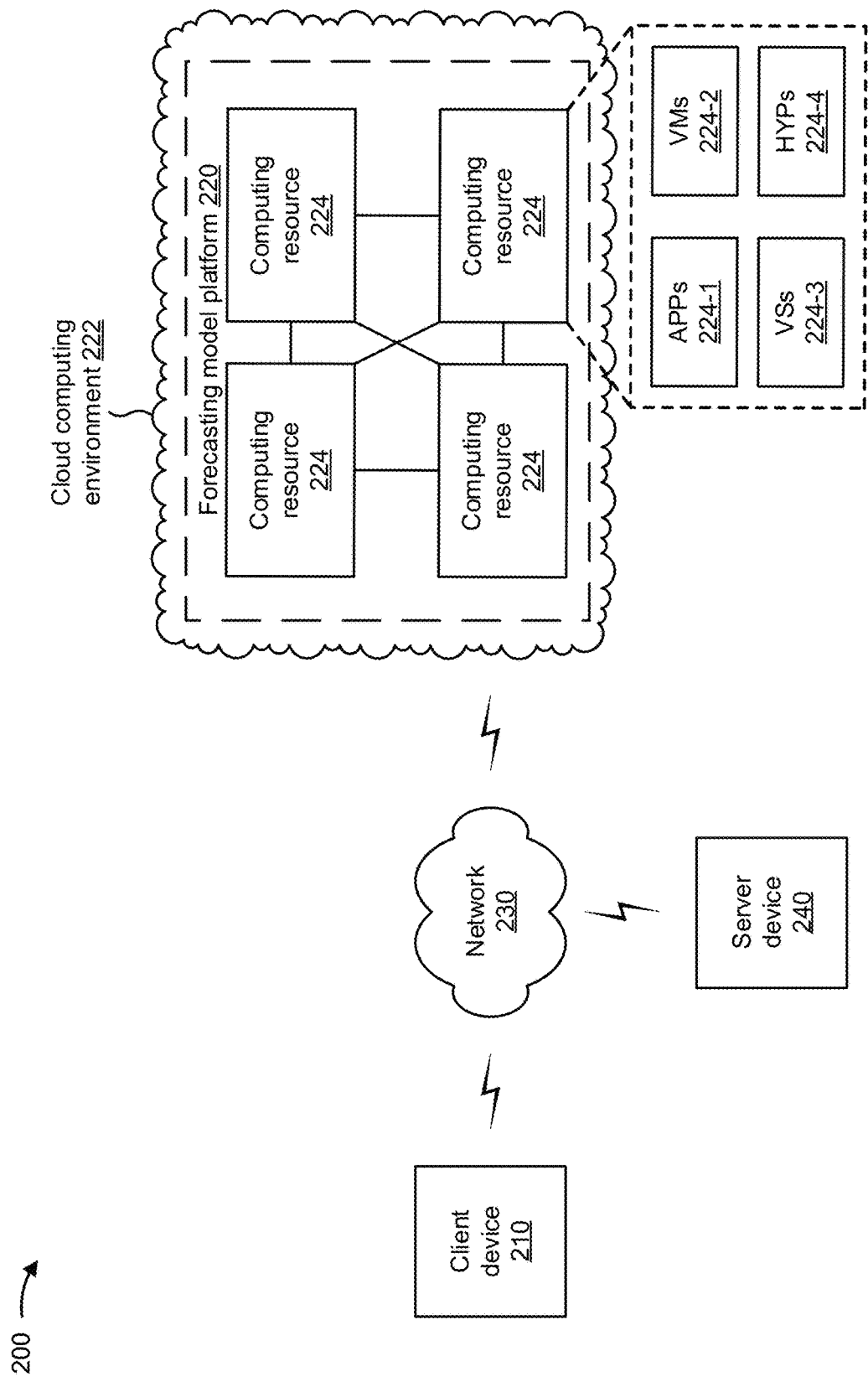
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a forecasting model platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to forecasting model platform 220 and/or server device 240.

Forecasting model platform 220 includes one or more devices that select optimum primary parameters and secondary parameters to calibrate and generate an unbiased forecasting model. In some implementations, forecasting model platform 220 may be designed to be modular such that certain software components may be swapped in or out depending on a particular need. As such, forecasting model platform 220 may be easily and/or quickly reconfigured for different uses. In some implementations, forecasting model platform 220 may receive information from and/or transmit information to one or more client devices 210 and/or server devices 240.

In some implementations, as shown, forecasting model platform 220 may be hosted in a cloud computing environment 222. Notably, while implementations described herein describe forecasting model platform 220 as being hosted in cloud computing environment 222, in some implementations, forecasting model platform 220 may not be cloud-based (i.e., may be implemented outside of a cloud computing environment) or may be partially cloud-based.

Cloud computing environment 222 includes an environment that hosts forecasting model platform 220. Cloud computing environment 222 may provide computation, software, data access, storage, etc., services that do not require end-user knowledge of a physical location and configuration of system(s) and/or device(s) that hosts forecasting model platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host forecasting model platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with forecasting model platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 and/or server device 240 or an operator of forecasting model platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device, associated with an entity as described above. In some implementations, server device 240 may receive information from and/or transmit information to client device 210 and/or forecasting model platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
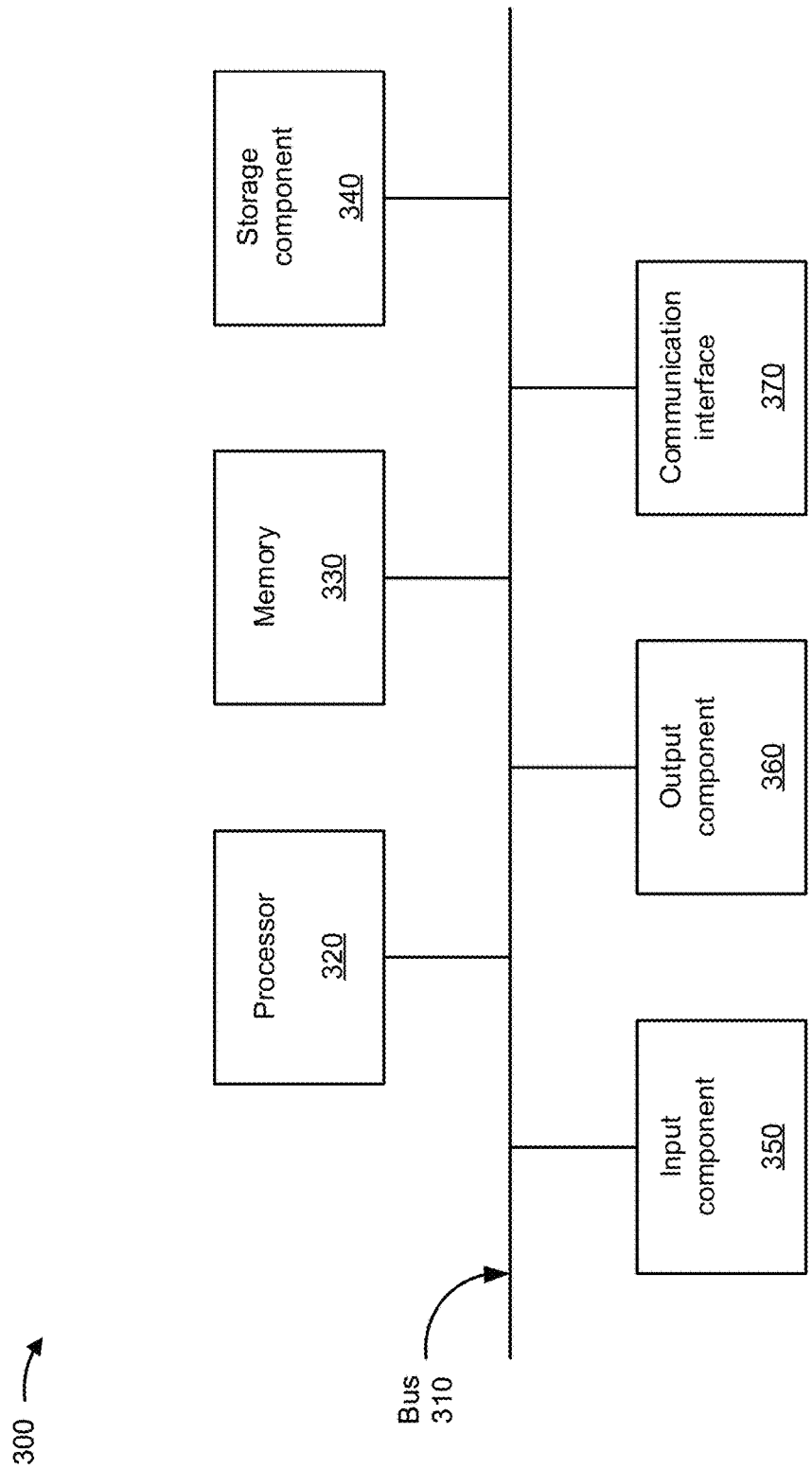
FIG. 3 is a diagram of example components of one or more devices of FIG. 2.

FIG. 3 is a diagram of example components of a device 300. Device 300 may correspond to client device 210, forecasting model platform 220, computing resource 224, and/or server device 240. In some implementations, client device 210, forecasting model platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
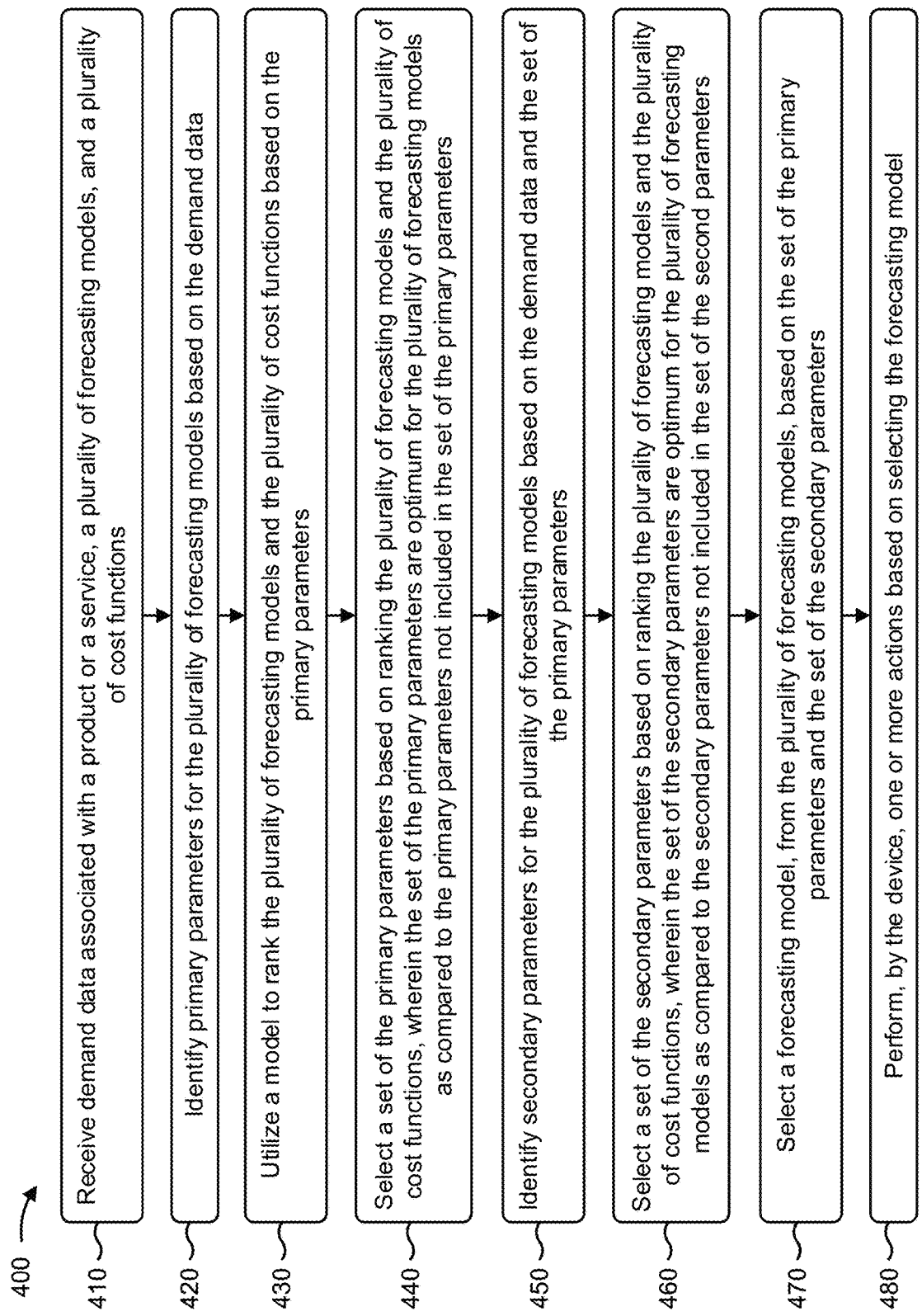

FIG. 4 is a flow chart of an example process 400 for selecting optimum primary parameters and secondary parameters to calibrate and generate an unbiased forecasting model. In some implementations, one or more process blocks of FIG. 4 may be performed by a device (e.g., forecasting model platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving demand data associated with a product or a service, a plurality of forecasting models, and a plurality of cost functions (block 410). For example, the device (e.g., using processor 320, computing resource 224, communication interface 370, and/or the like) may receive demand data associated with a product or a service, a plurality of forecasting models, and a plurality of cost functions, as described above.

As further shown in FIG. 4, process 400 may include identifying primary parameters for the plurality of forecasting models based on the demand data (block 420). For example, the device (e.g., using processor 320, computing resource 224, memory 330, and/or the like) may identify primary parameters for the plurality of forecasting models based on the demand data, as described above.

As further shown in FIG. 4, process 400 may include utilizing a model to rank the plurality of forecasting models and the plurality of cost functions based on the primary parameters (block 430). For example, the device (e.g., using processor 320, computing resource 224, storage component 340, and/or the like) may utilize a model to rank the plurality of forecasting models and the plurality of cost functions based on the primary parameters, as described above.

As further shown in FIG. 4, process 400 may include selecting a set of the primary parameters based on ranking the plurality of forecasting models and the plurality of cost functions, wherein the set of the primary parameters are optimum for the plurality of forecasting models as compared to the primary parameters not included in the set of the primary parameters (block 440). For example, the device (e.g., using processor 320, computing resource 224, memory 330, and/or the like) may select a set of the primary parameters based on ranking the plurality of forecasting models and the plurality of cost functions, as described above. In some implementations, the set of the primary parameters may be optimum for the plurality of forecasting models as compared to the primary parameters not included in the set of the primary parameters.

As further shown in FIG. 4, process 400 may include identifying secondary parameters for the plurality of forecasting models based on the demand data and the set of the primary parameters (block 450). For example, the device (e.g., using processor 320, computing resource 224, memory 330, storage component 340, and/or the like) may identify secondary parameters for the plurality of forecasting models based on the demand data and the set of the primary parameters, as described above.

As further shown in FIG. 4, process 400 may include selecting a set of the secondary parameters based on ranking the plurality of forecasting models and the plurality of cost functions, wherein the set of the secondary parameters are optimum for the plurality of forecasting models as compared to the secondary parameters not included in the set of the second parameters (block 460). For example, the device (e.g., using processor 320, computing resource 224, storage component 340, and/or the like) may select a set of the secondary parameters based on ranking the plurality of forecasting models and the plurality of cost functions, as described above. In some implementations, the set of the secondary parameters may be optimum for the plurality of forecasting models as compared to the secondary parameters not included in the set of the second parameters.

As further shown in FIG. 4, process 400 may include selecting a forecasting model, from the plurality of forecasting models, based on the set of the primary parameters and the set of the secondary parameters (block 470). For example, the device (e.g., using processor 320, computing resource 224, memory 330, and/or the like) may select a forecasting model, from the plurality of forecasting models, based on the set of the primary parameters and the set of the secondary parameters, as described above.

As further shown in FIG. 4, process 400 may include performing one or more actions based on selecting the forecasting model (block 480). For example, the device (e.g., using processor 320, computing resource 224, memory 330, storage component 340, communication interface 370, and/or the like) may perform one or more actions based on selecting the forecasting model, as described above.

Process 400 may include additional implementations, such as any single implementation or any combination of implementations described below and/or in connection with one or more other processes described elsewhere herein.

In a first implementation, process 400 may further include correcting parameters associated with the plurality of forecasting models based on the demand data.

In a second implementation, alone or in combination with the first implementation, the plurality of forecasting models may include a plurality of time series decomposition models.

In a third implementation, alone or in combination with one or more of the first and second implementations, selecting the set of the primary parameters may include process 400 processing the demand data, with the plurality of forecasting models and based on the primary parameters and ranking the plurality of forecasting models, to generate output data; processing the demand data and the output data, with the plurality of cost functions and based on ranking the plurality of cost functions, to determine differences between the demand data and the output data; and selecting the set of the primary parameters based on the differences between the demand data and the output data.

In a fourth implementation, alone or in combination with one or more of the first through third implementations, selecting the set of the secondary parameters may include process 400 processing the demand data, with the plurality of forecasting models and based on the secondary parameters and ranking the plurality of forecasting models, to generate output data; processing the demand data and the output data, with the plurality of cost functions and based on ranking the plurality of cost functions, to determine differences between the demand data and the output data; and selecting the set of the secondary parameters based on the differences between the demand data and the output data.

In a fifth implementation, alone or in combination with one or more of the first through fourth implementations, performing the one or more actions may include process 400 providing the forecasting model to a client device or a server device, utilizing the forecasting model to implement one or more pricing actions for the product or the service, utilizing the forecasting model to implement one or more promotions for the product or the service, calibrating the forecasting model based on a Bayesian tuning technique, or generating one or more predictions with the forecasting model.

In a sixth implementation, alone or in combination with one or more of the first through fifth implementations, selecting the set of the primary parameters may include process 400 simultaneously processing the demand data, with each of the plurality of forecasting models and based on a rank of each of the plurality of forecasting models and the primary parameters, to generate output data; simultaneously processing the demand data and the output data, with each of the plurality of cost functions and based on a rank of each of the plurality of cost functions, to determine differences between the demand data and the output data; and selecting the set of the primary parameters based on the differences between the demand data and the output data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
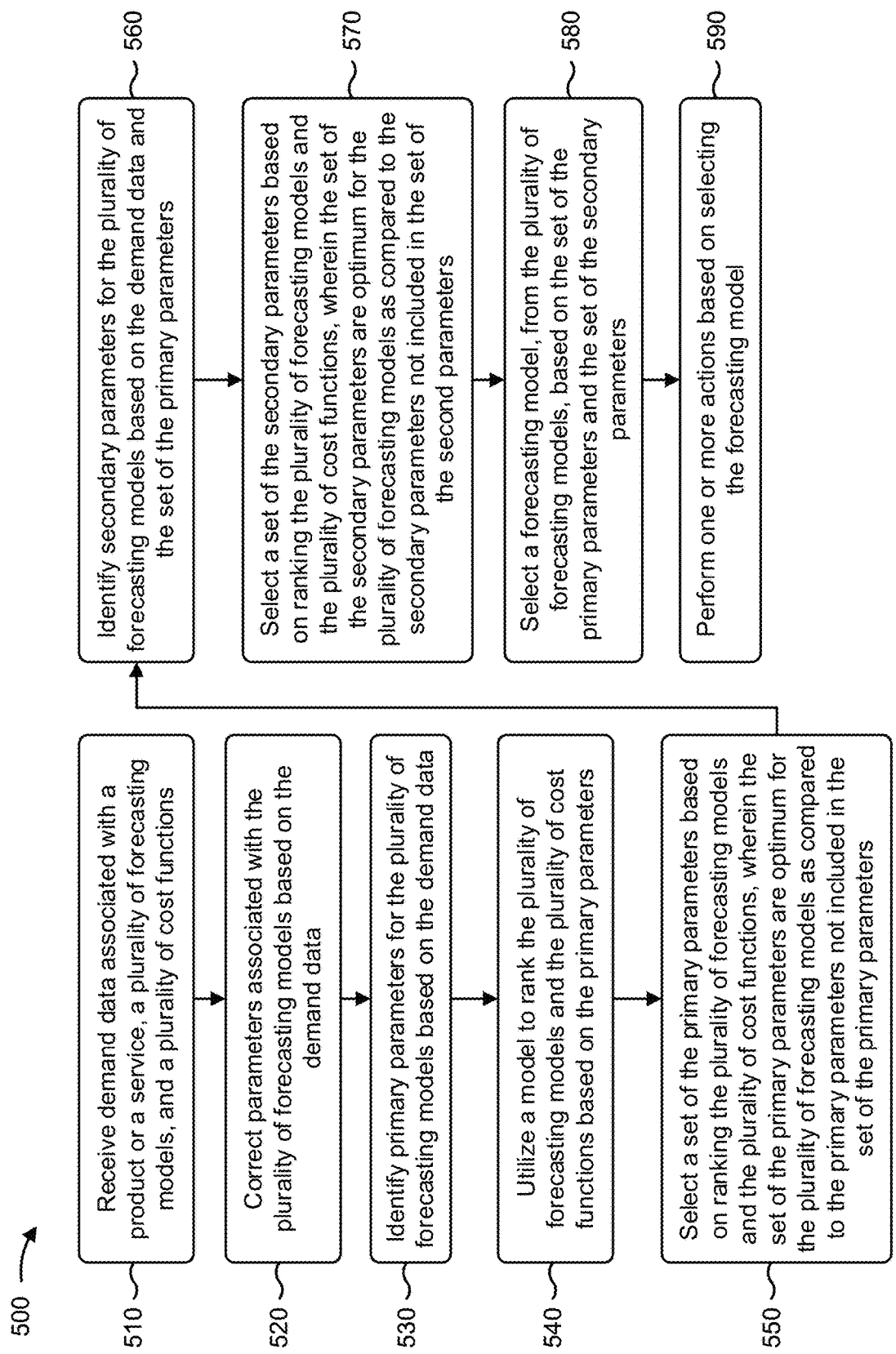

FIG. 5 is a flow chart of an example process 500 for selecting optimum primary parameters and secondary parameters to calibrate and generate an unbiased forecasting model. In some implementations, one or more process blocks of FIG. 5 may be performed by a device (e.g., forecasting model platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving demand data associated with a product or a service, a plurality of forecasting models, and a plurality of cost functions (block 510). For example, the device (e.g., using processor 320, computing resource 224, communication interface 370, and/or the like) may receive demand data associated with a product or a service, a plurality of forecasting models, and a plurality of cost functions, as described above.

As further shown in FIG. 5, process 500 may include correcting parameters associated with the plurality of forecasting models based on the demand data (block 520). For example, the device (e.g., using processor 320, computing resource 224, memory 330, and/or the like) may correct parameters associated with the plurality of forecasting models based on the demand data, as described above.

As further shown in FIG. 5, process 500 may include identifying primary parameters for the plurality of forecasting models based on the demand data (block 530). For example, the device (e.g., using processor 320, computing resource 224, storage component 340, and/or the like) may identify primary parameters for the plurality of forecasting models based on the demand data, as described above.

As further shown in FIG. 5, process 500 may include utilizing a model to rank the plurality of forecasting models and the plurality of cost functions based on the primary parameters (block 540). For example, the device (e.g., using processor 320, computing resource 224, memory 330, and/or the like) may utilize a model to rank the plurality of forecasting models and the plurality of cost functions based on the primary parameters, as described above.

As further shown in FIG. 5, process 500 may include selecting a set of the primary parameters based on ranking the plurality of forecasting models and the plurality of cost functions, wherein the set of the primary parameters are optimum for the plurality of forecasting models as compared to the primary parameters not included in the set of the primary parameters (block 550). For example, the device (e.g., using processor 320, computing resource 224, memory 330, storage component 340, and/or the like) may select a set of the primary parameters based on ranking the plurality of forecasting models and the plurality of cost functions, as described above. In some implementations, the set of the primary parameters may be optimum for the plurality of forecasting models as compared to the primary parameters not included in the set of the primary parameters.

As further shown in FIG. 5, process 500 may include identifying secondary parameters for the plurality of forecasting models based on the demand data and the set of the primary parameters (block 560). For example, the device (e.g., using processor 320, computing resource 224, memory 330, and/or the like) may identify secondary parameters for the plurality of forecasting models based on the demand data and the set of the primary parameters, as described above.

As further shown in FIG. 5, process 500 may include selecting a set of the secondary parameters based on ranking the plurality of forecasting models and the plurality of cost functions, wherein the set of the secondary parameters are optimum for the plurality of forecasting models as compared to the secondary parameters not included in the set of the second parameters (block 570). For example, the device (e.g., using processor 320, computing resource 224, storage component 340, and/or the like) may select a set of the secondary parameters based on ranking the plurality of forecasting models and the plurality of cost functions, as described above. In some implementations, the set of the secondary parameters may be optimum for the plurality of forecasting models as compared to the secondary parameters not included in the set of the second parameters.

As further shown in FIG. 5, process 500 may include selecting a forecasting model, from the plurality of forecasting models, based on the set of the primary parameters and the set of the secondary parameters (block 580). For example, the device (e.g., using processor 320, computing resource 224, memory 330, and/or the like) may select a forecasting model, from the plurality of forecasting models, based on the set of the primary parameters and the set of the secondary parameters, as described above.

As further shown in FIG. 5, process 500 may include performing one or more actions based on selecting the forecasting model (block 590). For example, the device (e.g., using processor 320, computing resource 224, memory 330, storage component 340, communication interface 370, and/or the like) may perform one or more actions based on selecting the forecasting model, as described above.

Process 500 may include additional implementations, such as any single implementation or any combination of implementations described below and/or in connection with one or more other processes described elsewhere herein.

In a first implementation, selecting the set of the secondary parameters may include process 500 simultaneously processing the demand data, with each of the plurality of forecasting models and based on a rank of each of the plurality of forecasting models and on the secondary parameters, to generate output data; simultaneously processing the demand data and the output data, with each of the plurality of cost functions and based on a rank of each of the plurality of cost functions, to determine differences between the demand data and the output data; and select the set of the secondary parameters based on the differences between the demand data and the output data.

In a second implementation, alone or in combination with the first implementation, the demand data may include syndicated demand data associated with the product or the service.

In a third implementation, alone or in combination with one or more of the first and second implementations, the model may include one or more of a global minimization of error model, a mean absolute percentage error (MAPE) model, or an R-squared regression model.

In a fourth implementation, alone or in combination with one or more of the first through third implementations, selecting the forecasting model may include process 500 selecting the forecasting model based on a mean absolute percentage error (MAPE) model and an R-squared regression model.

In a fifth implementation, alone or in combination with one or more of the first through fourth implementations, the set of the primary parameters may include one or more of a priority list of variables, an exhaustive true/false search for all variables, a false model average of variables per a Bayesian framework, or reconsidered true/false variables.

In a sixth implementation, alone or in combination with one or more of the first through fifth implementations, the set of the secondary parameters may include one or more of a correlation threshold, variables to observations ratio, a smoothing parameter, a confidence interval, a quantity of variables created, base price elasticities, or a promotion benchmark.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for selecting optimum primary parameters and secondary parameters to calibrate and generate an unbiased forecasting model. In some implementations, one or more process blocks of FIG. 6 may be performed by a device (e.g., forecasting model platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving demand data associated with a product or a service, a plurality of forecasting models, and a plurality of cost functions (block 610). For example, the device (e.g., using processor 320, computing resource 224, communication interface 370, and/or the like) may receive demand data associated with a product or a service, a plurality of forecasting models, and a plurality of cost functions, as described above.

As further shown in FIG. 6, process 600 may include identifying primary parameters for the plurality of forecasting models based on the demand data (block 620). For example, the device (e.g., using processor 320, computing resource 224, memory 330, and/or the like) may identify primary parameters for the plurality of forecasting models based on the demand data, as described above.

As further shown in FIG. 6, process 600 may include utilizing a model to rank the plurality of forecasting models and the plurality of cost functions based on the primary parameters (block 630). For example, the device (e.g., using processor 320, computing resource 224, storage component 340, and/or the like) may utilize a model to rank the plurality of forecasting models and the plurality of cost functions based on the primary parameters, as described above.

As further shown in FIG. 6, process 600 may include selecting a set of the primary parameters based on ranking the plurality of forecasting models and the plurality of cost functions, wherein the set of the primary parameters are optimum for the plurality of forecasting models as compared to the primary parameters not included in the set of the primary parameters (block 640). For example, the device (e.g., using processor 320, computing resource 224, memory 330, and/or the like) may select a set of the primary parameters based on ranking the plurality of forecasting models and the plurality of cost functions, as described above. In some implementations, the set of the primary parameters may be optimum for the plurality of forecasting models as compared to the primary parameters not included in the set of the primary parameters.

As further shown in FIG. 6, process 600 may include identifying secondary parameters for the plurality of forecasting models based on the demand data and the set of the primary parameters (block 650). For example, the device (e.g., using processor 320, computing resource 224, storage component 340, and/or the like) may identify secondary parameters for the plurality of forecasting models based on the demand data and the set of the primary parameters, as described above.

As further shown in FIG. 6, process 600 may include selecting a set of the secondary parameters based on ranking the plurality of forecasting models and the plurality of cost functions (block 660). For example, the device (e.g., using processor 320, computing resource 224, memory 330, storage component 340, and/or the like) may select a set of the secondary parameters based on ranking the plurality of forecasting models and the plurality of cost functions, as described above. In some implementations, the set of the secondary parameters may be optimum for the plurality of forecasting models as compared to the secondary parameters not included in the set of the second parameters.

As further shown in FIG. 6, process 600 may include selecting a forecasting model, from the plurality of forecasting models, based on the set of the primary parameters and the set of the secondary parameters (block 670). For example, the device (e.g., using processor 320, computing resource 224, memory 330, and/or the like) may select a forecasting model, from the plurality of forecasting models, based on the set of the primary parameters and the set of the secondary parameters, as described above.

As further shown in FIG. 6, process 600 may include performing one or more actions based on selecting the forecasting model, wherein the one or more actions include one or more of providing the forecasting model to a client device or a server device, utilizing the forecasting model to implement one or more pricing actions for the product or the service, utilizing the forecasting model to implement one or more promotions for the product or the service, calibrating the forecasting model based on a Bayesian tuning technique, or generating one or more predictions with the forecasting model (block 680). For example, the device (e.g., using processor 320, computing resource 224, memory 330, storage component 340, communication interface 370, and/or the like) may perform one or more actions based on selecting the forecasting model, as described above. In some implementations, the one or more actions may include one or more of providing the forecasting model to a client device or a server device, utilizing the forecasting model to implement one or more pricing actions for the product or the service, utilizing the forecasting model to implement one or more promotions for the product or the service, calibrating the forecasting model based on a Bayesian tuning technique, or generating one or more predictions with the forecasting model.

Process 600 may include additional implementations, such as any single implementation or any combination of implementations described below and/or in connection with one or more other processes described elsewhere herein.

In a first implementation, process 600 may further include correcting parameters associated with the plurality of forecasting models based on the demand data.

In a second implementation, alone or in combination with the first implementation, selecting the set of the primary parameters may include process 600 processing the demand data, with the plurality of forecasting models and based on the primary parameters and ranking the plurality of forecasting models, to generate output data; processing the demand data and the output data, with the plurality of cost functions and based on ranking the plurality of cost functions, to determine differences between the demand data and the output data; and selecting the set of the primary parameters based on the differences between the demand data and the output data.

In a third implementation, alone or in combination with one or more of the first and second implementations, selecting the set of the secondary parameters may include process 600 processing the demand data, with the plurality of forecasting models and based on the secondary parameters and ranking the plurality of forecasting models, to generate output data; processing the demand data and the output data, with the plurality of cost functions and based on ranking the plurality of cost functions, to determine differences between the demand data and the output data; and selecting the set of the secondary parameters based on the differences between the demand data and the output data.

In a fourth implementation, alone or in combination with one or more of the first through third implementations, the model may include one or more of: a global minimization of error model, a mean absolute percentage error (MAPE) model, or an R-squared regression model.

In a fifth implementation, alone or in combination with one or more of the first through fourth implementations, selecting the forecasting model may include process 600 selecting the forecasting model based on a mean absolute percentage error (MADE) model and an R-squared regression model.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, demand data, a plurality of forecasting models, and a plurality of cost functions;
   training, by the device, a machine learning model;
   processing, by the device, the plurality of forecasting models, with the machine learning model, to generate a plurality of optimized forecasting models;
   identifying, by the device, primary parameters for the plurality of optimized forecasting models based on the demand data,
      wherein the primary parameters include one or more of:
         an exhaustive true/false search for all variables,
         a false model average of variables per a Bayesian framework, or
         reconsidered true/false variables;
   utilizing, by the device, a model to rank the plurality of optimized forecasting models and the plurality of cost functions based on the primary parameters,
      wherein utilizing the model to rank the plurality of optimized forecasting models and the plurality of cost functions comprises:
         determining a mean absolute percentage error to measure a prediction accuracy of each of the plurality of optimized forecasting models and each of the plurality of cost functions based on the primary parameters;
   selecting, by the device, a set of the primary parameters based on ranking the plurality of optimized forecasting models and the plurality of cost functions,
      wherein the set of the primary parameters are optimum for the plurality of optimized forecasting models as compared to the primary parameters not included in the set of the primary parameters;
   identifying, by the device, secondary parameters for the plurality of forecasting models based on the demand data and the set of the primary parameters;
   selecting, by the device, a set of the secondary parameters based on ranking the plurality of optimized forecasting models and the plurality of cost functions,
      wherein the set of the secondary parameters are optimum for the plurality of optimized forecasting models as compared to the secondary parameters not included in the set of the secondary parameters;
   selecting, by the device, a forecasting model, from the plurality of optimized forecasting models, to generate a calibrated and unbiased forecasting model that utilizes the primary parameters and the secondary parameters to conserve computing resources based on the set of the primary parameters and the set of the secondary parameters; and
   performing, by the device, one or more actions based on selecting the forecasting model,
      where performing the one or more actions comprises:
         providing updated data associated with the plurality of forecasting models to retrain the machine learning model in order to update the machine learning model; and
         implementing pricing actions for one or more of:
            coupons,
            rebates,
            wholesale prices, or
            sale prices.

2. The method of claim 1, wherein the plurality of optimized forecasting models include a plurality of time series decomposition models.

3. The method of claim 1, wherein selecting the set of the primary parameters comprises:
   processing the demand data, with the plurality of optimized forecasting models and based on the primary parameters and ranking the plurality of forecasting models, to generate output data;
   processing the demand data and the output data, with the plurality of cost functions and based on ranking the plurality of cost functions, to determine differences between the demand data and the output data; and
   selecting the set of the primary parameters based on the differences between the demand data and the output data.

4. The method of claim 1, wherein selecting the set of the secondary parameters comprises:
   processing the demand data, with the plurality of optimized forecasting models and based on the secondary parameters and ranking the plurality of optimized forecasting models, to generate output data;
   processing the demand data and the output data, with the plurality of cost functions and based on ranking the plurality of cost functions, to determine differences between the demand data and the output data; and
   selecting the set of the secondary parameters based on the differences between the demand data and the output data.

5. The method of claim 1, wherein performing the one or more actions comprises one or more of:
   providing the forecasting model to a client device or a server device;
   utilizing the forecasting model to implement one or more pricing actions for a product or service;
   utilizing the forecasting model to implement one or more promotions for a product or service;
   calibrating the forecasting model based on a Bayesian tuning technique; or
   generating one or more predictions with the forecasting model.

6. The method of claim 1, wherein selecting the set of the primary parameters comprises:
   simultaneously processing the demand data, with each of the plurality of optimized forecasting models and based on a rank of each of the plurality of forecasting models and the primary parameters, to generate output data;
   simultaneously processing the demand data and the output data, with each of the plurality of cost functions and based on a rank of each of the plurality of cost functions, to determine differences between the demand data and the output data; and
   selecting the set of the primary parameters based on the differences between the demand data and the output data.

7. A device, comprising:
   one or more memories; and
   one or more processors, communicatively coupled to the one or more memories, configured to:
      receive demand data associated a service, a plurality of forecasting models, and a plurality of cost functions;

train a machine learning model;
process the plurality of forecasting models, with the machine learning model, to generate a plurality of optimized forecasting models;
identify primary parameters for the plurality of forecasting models based on the demand data,
  wherein the primary parameters include one or more of:
    an exhaustive true/false search for all variables, or
    a false model average of variables per a Bayesian framework;
utilize a model to rank the plurality of forecasting models and the plurality of cost functions based on the primary parameters,
  wherein the one or more processors, to utilize the model to rank the plurality of optimized forecasting models and the plurality of cost functions, are to:
    determine a mean absolute percentage error to measure a prediction accuracy of each of the plurality of optimized forecasting models and each of the plurality of cost functions based on the primary parameters;
select a set of the primary parameters based on ranking the plurality of forecasting models and the plurality of cost functions,
  wherein the set of the primary parameters are optimum for the plurality of forecasting models as compared to the primary parameters not included in the set of the primary parameters;
identify secondary parameters for the plurality of forecasting models based on the demand data and the set of the primary parameters;
select a set of the secondary parameters based on ranking the plurality of forecasting models and the plurality of cost functions,
  wherein the set of the secondary parameters are optimum for the plurality of forecasting models as compared to the secondary parameters not included in the set of the secondary parameters;
select a forecasting model, from the plurality of forecasting models, to generate a calibrated and unbiased forecasting model that utilizes the primary parameters and the secondary parameters to conserve computing resources based on the set of the primary parameters and the set of the secondary parameters; and
perform one or more actions based on selecting the forecasting model,
  wherein the one or more processors, to perform the one or more actions, are to:
    provide updated data associated with the plurality of forecasting models to retrain the machine learning model in order to update the machine learning model; and
    implement pricing actions for one or more of:
      coupons,
      rebates,
      wholesale prices, or
      sale prices.

8. The device of claim 7, wherein the demand data includes syndicated demand data associated with the service.

9. The device of claim 7, wherein the plurality of optimized forecasting models include a plurality of time series decomposition models.

10. The device of claim 7, wherein the one or more processors, to perform the one or more actions, are to:
  utilize the forecasting model to implement one or more pricing actions for the service;
  utilize the forecasting model to implement one or more promotions for the service; or
  calibrate the forecasting model based on a Bayesian tuning technique.

11. The device of claim 7, wherein the model includes a global minimization of error model.

12. The device of claim 7, wherein the one or more processors, to select the set of the primary parameters, are to:
  simultaneously process the demand data, with each of the plurality of optimized forecasting models and based on a rank of each of the plurality of forecasting models and the primary parameters, to generate output data;
  simultaneously process the demand data and the output data, with each of the plurality of cost functions and based on a rank of each of the plurality of cost functions, to determine differences between the demand data and the output data; and
  select the set of the primary parameters based on the differences between the demand data and the output data.

13. The device of claim 7, wherein the set of the secondary parameters include one or more of:
  variables to observations ratio,
  a smoothing parameter,
  a quantity of variables created,
  base price elasticities, or
  a promotion benchmark.

14. The device of claim 7, wherein the one or processors, to select the forecasting model, are to:
  select the forecasting model based on a mean absolute percentage error (MAPE) model and an R-squared regression model.

15. A non-transitory computer-readable medium storing instructions, the instructions comprising:
  one or more instructions that, when executed by one or more processors, cause the one or more processors to:
    receive demand data, a plurality of forecasting models, and a plurality of cost functions;
    train a machine learning model;
    process the plurality of forecasting models, with the machine learning model, to generate a plurality of optimized forecasting models;
    identify primary parameters for the plurality of optimized forecasting models based on the demand data,
    utilize a model to rank the plurality of forecasting models and the plurality of cost functions based on the primary parameters,
      wherein the one or more instructions, that cause the one or more processors to utilize the model to rank the plurality of optimized forecasting models and the plurality of cost functions, cause the one or more processors to:
        determine a mean absolute percentage error to measure a prediction accuracy of each of the plurality of optimized forecasting models and each of the plurality of cost functions based on the primary parameters;
    select a set of the primary parameters based on ranking the plurality of optimized forecasting models and the plurality of cost functions,
      wherein the set of the primary parameters are optimum for the plurality of optimized forecasting models as compared to the primary parameters not included in the set of the primary parameters;
identify secondary parameters for the plurality of optimized forecasting models based on the demand data and the set of the primary parameters;
select a set of the secondary parameters based on ranking the plurality of forecasting models and the plurality of cost functions,
wherein the set of the secondary parameters are optimum for the plurality of forecasting models as compared to the secondary parameters not included in the set of the secondary parameters;
select a forecasting model, from the plurality of optimized forecasting models, to generate a calibrated and unbiased forecasting model that utilizes the primary parameters and the secondary parameters to conserve computing resources based on the set of the primary parameters and the set of the secondary parameters; and
perform one or more actions based on selecting the forecasting model,
wherein the one or more processors, to perform the one or more actions, are to:
provide updated data associated with the plurality of forecasting models to retrain the machine learning model in order to update the machine learning model, and
implement pricing actions for one or more of:
coupons,
rebates,
wholesale prices, or
sale prices.

16. The non-transitory computer-readable medium of claim 15, wherein the instructions further comprise:
one or more instructions that, when executed by the one or more processors, cause the one or more processors to:
correct parameters associated with the plurality of optimized forecasting models based on the demand data.

17. The non-transitory computer-readable medium of claim 15, wherein the one or more instructions, that cause the one or more processors to select the set of the primary parameters, cause the one or more processors to:
process the demand data, with the plurality of optimized forecasting models and based on the primary parameters and ranking the plurality of optimized forecasting models, to generate output data;
process the demand data and the output data, with the plurality of cost functions and based on ranking the plurality of cost functions, to determine differences between the demand data and the output data; and
select the set of the primary parameters based on the differences between the demand data and the output data.

18. The non-transitory computer-readable medium of claim 15, wherein the one or more instructions, that cause the one or more processors to select the set of the secondary parameters, cause the one or more processors to:
process the demand data, with the plurality of forecasting models and based on the secondary parameters and ranking the plurality of forecasting models, to generate output data;
process the demand data and the output data, with the plurality of cost functions and based on ranking the plurality of cost functions, to determine differences between the demand data and the output data; and
select the set of the secondary parameters based on the differences between the demand data and the output data.

19. The non-transitory computer-readable medium of claim 15, wherein the model includes one or more of:
a global minimization of error model,
a mean absolute percentage error (MAPE) model, or
an R-squared regression model.

20. The non-transitory computer-readable medium of claim 15, wherein the one or more processors, to perform the one or more actions, are to:
automatically facilitate generation of promotions or pricing actions for a product or service.

* * * * *